United States Patent
Papasakellariou

(10) Patent No.: US 10,142,945 B2
(45) Date of Patent: Nov. 27, 2018

(54) POWER CONTROL FOR TRANSMISSION OF UPLINK CONTROL INFORMATION ON TWO CELLS IN CARRIER AGGREGATION

(71) Applicant: Samsung Electronics Co., Ltd., Suwon-si, Gyeonggi-do (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/727,244

(22) Filed: Jun. 1, 2015

(65) Prior Publication Data
US 2015/0358924 A1   Dec. 10, 2015

Related U.S. Application Data

(60) Provisional application No. 62/008,338, filed on Jun. 5, 2014.

(51) Int. Cl.
*H04W 52/34*   (2009.01)
*H04W 72/04*   (2009.01)
(Continued)

(52) U.S. Cl.
CPC ......... *H04W 52/34* (2013.01); *H04W 52/346* (2013.01); *H04W 52/367* (2013.01);
(Continued)

(58) Field of Classification Search
CPC . H04W 52/34; H04W 52/346; H04W 52/367; H04W 72/0406; H04W 72/0473; H04W 52/146
See application file for complete search history.

(56) References Cited

U.S. PATENT DOCUMENTS

2011/0243087 A1* 10/2011 Ahn ................. H04W 52/146
370/329
2013/0176953 A1* 7/2013 Stern-Berkowitz .........
H04W 52/146
370/329
(Continued)

FOREIGN PATENT DOCUMENTS

WO   WO2015139224 A1 *  9/2015

OTHER PUBLICATIONS

International Search Report dated Sep. 7, 2015 in connection with International Application No. PCT/KR2015/005681, 3 pages.
(Continued)

*Primary Examiner* — Shailendra Kumar

(57) ABSTRACT

Methods and apparatus are provided for a network to control a power of transmissions from a User Equipment (UE) on a first Cell Group (CG) or on a second CG depending on a communication delay between the two CGs. Methods and apparatus are also provided for a UE configured with a first CG and a second CG in Carrier Aggregation (CA) operation to determine whether or not to transmit a channel conveying control information when the UE needs to reduce a respective nominal transmission power. Methods and apparatus are additionally provided for a network to transmit and for a UE to receive a Transmission Power Control (TPC) command for transmission on a cell of a first CG or on a cell of a second CG.

20 Claims, 8 Drawing Sheets

(51) Int. Cl.
H04W 52/36 (2009.01)
H04W 52/14 (2009.01)
(52) U.S. Cl.
CPC ... *H04W 72/0406* (2013.01); *H04W 72/0473* (2013.01); *H04W 52/146* (2013.01)

(56) References Cited

U.S. PATENT DOCUMENTS

| | | | | |
|---|---|---|---|---|
| 2013/0182654 A1* | 7/2013 | Hariharan | ............ | H04W 52/54 370/329 |
| 2014/0177602 A1* | 6/2014 | Chen | ............ | H04W 52/04 370/336 |
| 2015/0271758 A1* | 9/2015 | Park | ............ | H04W 52/146 370/280 |
| 2015/0341865 A1* | 11/2015 | Yang | ............ | H04W 52/146 455/522 |
| 2016/0249338 A1* | 8/2016 | Hwang | ............ | H04L 1/1861 |
| 2017/0013565 A1* | 1/2017 | Pelletier | ............ | H04W 52/146 |

OTHER PUBLICATIONS

Written Opinion of the International Searching Authority dated Sep. 7, 2015 in connection with International Application No. PCT/KR2015/005681, 4 pages.
3GPP TSG-RAN WG2 Meeting #84; "Management of UE Transmit Power in Dual Connectivity"; LG Electronics Inc.; Nov. 11-15, 2013; 3 pages; R2-134048; San Francisco, U.S.
3GPP TSG RAN WG2 Meeting #84; "Uplink transmission power management and PHR reporting for dual connectivity"; Panasonic; Nov. 11-15, 2013; 4 pages; R2-133945; San Francisco, U.S.
3GPP TSG-RAN WG2 Meeting #83; "Challenge on UL transmission of dual connectivity"; Pantech; Aug. 19-23, 2013; 8 pages; R2-132504; Barcelona, Spain.
FiberHome, "Discussion on Dynamic Power-sharing of DC UL transmission" 3GPP TSG RAN WG1 Meeting #77, May 19-23, 2014, 5 pages, R1-142287.
NTT Docomo, "Summary of email discussion [76b-08]", 3GPP TSG RAN WG1 Meeting #77, May 19-23, 2014, 30 pages, R1-142263.
Supplementary Partial European Search Report dated Nov. 28, 2017 in connection with European Patent Application No. 15 80 3145.
Communication from a foreign patent office in a counterpart foreign application, European Patent Office, "Supplementary European Search Report," Application No. EP 15803145.0, dated Mar. 27, 2018, 13 pages.
Alcatel-Lucent Shanghai Bell, et al., "UL Power Control and Power Scaling for Dual Connectivity," R1-140165, 3GPP TSG RAN WG1 Meeting #76, Prague, Czech Republic, Feb. 10-14, 2014, 5 pages.
NEC, "UL power control and splitting in dual connectivity", 3GPP TSG RAN WG1 Meeting #76bis, Mar. 31-Apr. 4, 2014, 8 pages, R1-141204.
Office Action dated Sep. 24, 2018 in connection with European Patent Application No. 15 803 145.0, 9 pages.

* cited by examiner

POWER CONTROL FOR TRANSMISSION OF UPLINK CONTROL INFORMATION ON TWO CELLS IN CARRIER AGGREGATION

CROSS-REFERENCE TO RELATED APPLICATION AND CLAIM OF PRIORITY

The present application claims priority under 35 U.S.C. § 119(e) to U.S. Provisional Patent Application Ser. No. 62/008,338 filed Jun. 5, 2014, entitled "Transmission of Uplink Control Information on Two Cells for Carrier Aggregation." The contents of the above-identified patent document are incorporated herein by reference.

TECHNICAL FIELD

The present application relates generally to wireless communications and, more specifically, to transmission of uplink control information in carrier aggregation operation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support transmissions of uplink control information from a User Equipment (UE) in carrier aggregation operation.

In a first embodiment, a method is provided. The method includes receiving, by a user equipment (UE) from a network that includes a number of cells, a configuration for a first group of cells and for a second group of cells. The method additionally includes transmitting from the UE on the first group of cells and on the second group of cells in a transmission time interval (TTI). When a communication delay between the first group of cells and the second group of cells is larger than a value, the UE is configured by the network to reserve in the TTI a first percentage of a maximum power for transmissions on the first group of cells and a second percentage of the maximum power for transmissions on the second group of cells. When the communication delay between the first group of cells and the second group of cells is smaller than or equal to the value, the UE is not configured to reserve in the TTI a power for transmissions on the first group of cells or on the second group of cells.

In a second embodiment, a method is provided. The method includes receiving, by a user equipment (UE) from a network that includes a number of cells a configuration for a first group of cells and for a second group of cells and a configuration for TPC-PUCCH-RNTI bits, for a first location of transmit power control (TPC) bits, and for a second location of TPC bits in a downlink control information (DCI) format that includes cyclic redundancy check (CRC) bits that are scrambled with the TPC-PUCCH-RNTI bits. The method additionally includes detecting by the UE a DCI format with CRC bits scrambled by the TPC-PUCCH-RNTI bits on a predetermined cell from the first group of cells. The method also includes transmitting by the UE a first physical uplink control channel (PUCCH) in a first cell of the first group of cells using a power adjustment determined by the TPC bits at the first location in the DCI format or a second PUCCH in a second cell of the second group of cells using a power adjustment determined by the TPC bits at the second location in the DCI format.

In a third embodiment, a user equipment (UE) is provided. The UE includes a receiver and a transmitter. The receiver is configured to receive a configuration for a first group of cells and for a second group of cells. The transmitter is configured to transmit on the first group of cells and on the second group of cells in a transmission time interval (TTI). When a communication delay between the first group of cells and the second group of cells is larger than a value, the UE is configured to reserve in the TTI a first percentage of a maximum power for transmissions on the first group of cells and a second percentage of the maximum power for transmissions on the second group of cells. When the communication delay between the first group of cells and the second group of cells is smaller than or equal to the value, the UE does not reserve in the TTI a power for transmissions on the first group of cells or on the second group of cells.

In a fourth embodiment, a user equipment (UE) includes a receiver, a detector, and a transmitter. The receiver configured to receive a configuration for a first group of cells and for a second group of cells and a configuration for TPC-PUCCH-RNTI bits, for a first location of transmit power control (TPC) bits, and for a second location of TPC bits in a downlink control information (DCI) format that includes cyclic redundancy check (CRC) bits that are scrambled with the TPC-PUCCH-RNTI bits. The detector is configured to detect a DCI format with CRC bits scrambled by the TPC-PUCCH-RNTI bits on a predetermined cell from the first group of cells. The transmitter is configured to transmit a first physical uplink control channel (PUCCH) in a first cell of the first group of cells using a power adjustment determined by the TPC bits at the first location in the DCI format or a second PUCCH in a second cell of the second group of cells using a power adjustment determined by the TPC bits at the second location in the DCI format.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many when not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v12.1.0, "E-UTRA, Physical channels and modulation" (REF 1); 3GPP TS 36.212 v12.1.0, "E-UTRA, Multiplexing and Channel coding" (REF 2); 3GPP TS 36.213 v12.1.0, "E-UTRA, Physical Layer Procedures" (REF 3); 3GPP TS 36.331 v12.1.0, "E-UTRA, Radio Resource Control (RRC) Protocol Specification" (REF 4); and U.S. patent application Ser. No. 14/591,756, filed on Jan. 7, 2015 and entitled "UPLINK TRANSMISSIONS FOR DUAL CONNECTIVITY" (REF 5).

One or more embodiments of the present disclosure relate to transmissions of uplink control information in carrier aggregation operation. A wireless communication network includes a Downlink (DL) that conveys signals from transmission points, such as base stations or enhanced NodeBs (eNBs), to UEs. The wireless communication network also includes an Uplink (UL) that conveys signals from UEs to reception points, such as eNBs.

Figure 1:
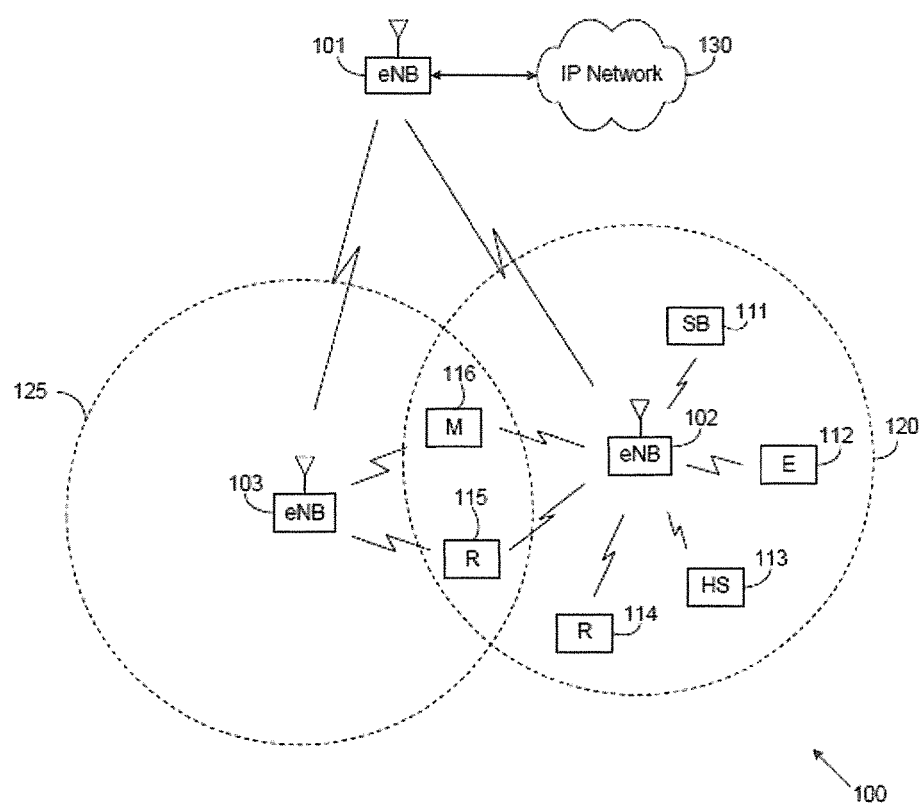
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide support for DL or UL transmissions in carrier aggregation operation.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly between them or with the network 130 and provide UEs with direct wireless broadband access to the network 130. Further, the eNB 101, 102, and/or 103 could provide access to other or additional external networks, such as external telephone networks or other types of data networks.

Figure 2:
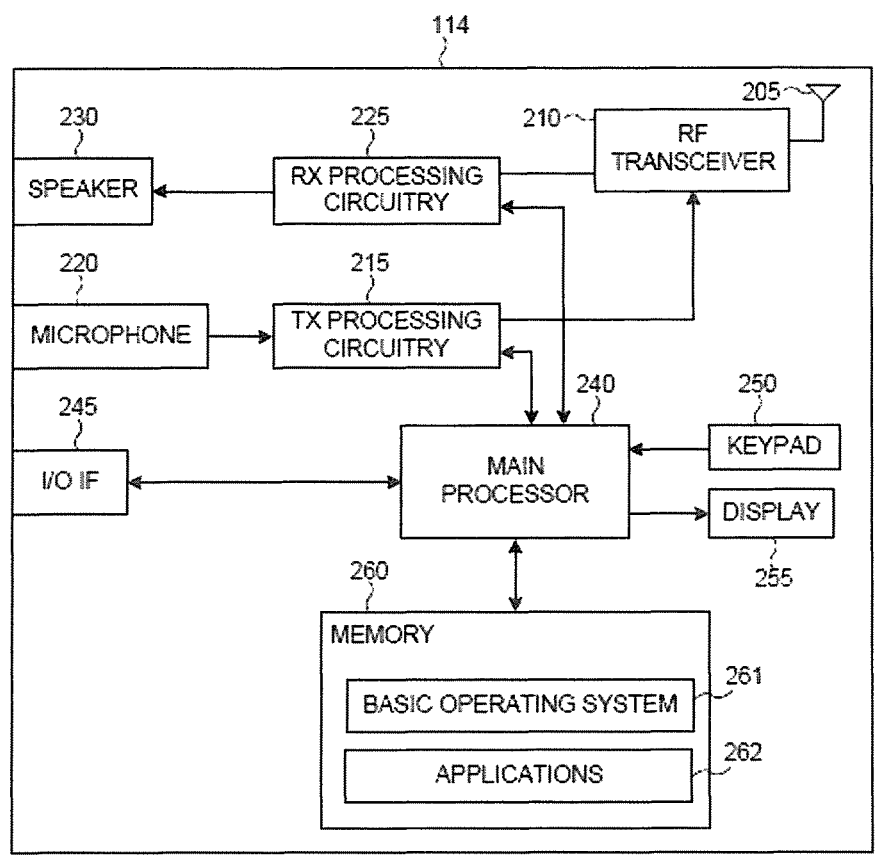
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260 such as operations for transmission of uplink control information in a carrier aggregation operation. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a control or data signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support respective DL or UL transmissions in carrier aggregation operation.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
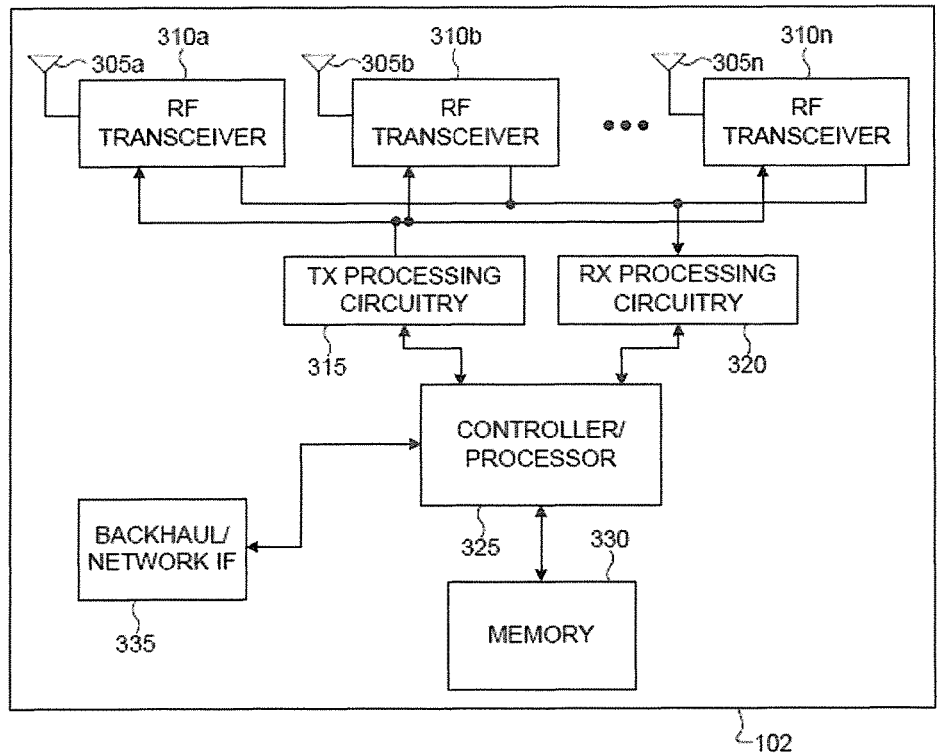
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS and operations to support transmissions of uplink control information from a User Equipment (UE) in carrier aggregation operation. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs, such as eNB 103, over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support respective DL or UL transmissions in carrier aggregation operation.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals can include data signals conveying information content, control signals conveying DL Control Information (DCI), and Reference Signals (RS) that are also known as pilot signals. An eNB, such as eNB 102, can transmit one or more of multiple types of RS, including UE-Common RS (CRS), Channel State Information RS (CSI-RS), and DeModulation RS (DMRS). A CRS can be transmitted over a DL system BandWidth (BW) and can be used by a UE, such as UE 116, to demodulate data or control signals or to perform measurements. To reduce CRS overhead, eNB 102 can transmit a CSI-RS with a smaller density in the time or frequency domain than a CRS (see also REF 1 and REF 3). UE 116 can use either a CRS or a CSI-RS to perform measurements and a selection can be based on a Transmission Mode (TM) UE 116 is configured by eNB 102 for Physical DL Shared CHannel (PDSCH) reception (see also REF 3). Finally, DMRS is transmitted only in the BW of a respective PDSCH or Physical DL Control CHannel (PDCCH) and UE 116 can use the DMRS to demodulate information in a PDSCH or PDCCH.

In response to a detection of a data TB transmitted by UE 116, eNB 102 can transmit a Physical HARQ Indicator CHannel (PHICH) providing Hybrid Automatic Repeat reQuest ACKnowledgement (HARQ-ACK) information regarding a correct (positive acknowledgement) or incorrect (negative acknowledgement) detection of the data TB.

DCI can serve several purposes. A DCI format in a respective PDCCH can schedule a PDSCH transmission or a PUSCH transmission conveying data information to or from UE 116, respectively (see also REF 2). In some implementations, UE 116 monitors a DCI format 3 or a DCI format 3A (jointly referred to as DCI format 3/3A) that provide Transmission Power Control (TPC) commands to a group of UEs for transmissions of PUSCHs or PUCCHs. DCI format 3 provides 2-bit TPC commands while DCI format 3A provides 1-bit TPC commands. A DCI format typically includes Cyclic Redundancy Check (CRC) bits in order for UE 116 to confirm a correct detection. A DCI format type is identified by a Radio Network Temporary Identifier (RNTI) that scrambles the CRC bits (see also REF 2). For a DCI format scheduling a PDSCH or a PUSCH to a single UE, the RNTI can be a Cell RNTI (C-RNTI) and serves as a UE identifier. For a DCI format providing TPC commands to a group of UEs, the RNTI can be a TPC-PUSCH-RNTI or a TPC-PUCCH-RNTI depending on whether the TPC commands are intended for adjusting a power of PUSCH transmissions or of PUCCH transmissions, respectively. Each RNTI type can be configured to UE 116 through higher-layer signaling such as RRC signaling (and a C-RNTI is unique to each UE) from eNB 102.

Figure 4:
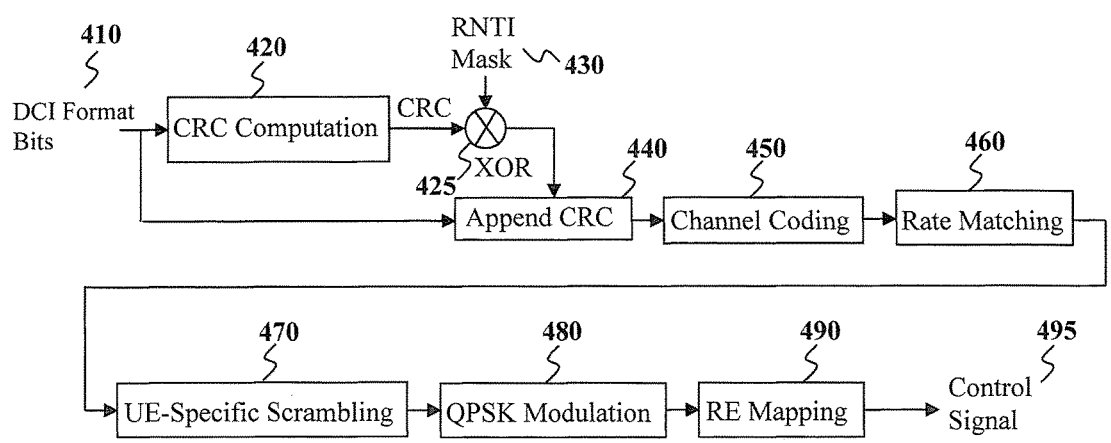
FIG. 4 illustrates an example encoding process for a Downlink Control Information (DCI) format according to this disclosure.

FIG. 4 illustrates an example encoding process for a DCI format according to this disclosure. The embodiment of the encoding process shown in FIG. 4 is for illustration only. Other embodiments could be used without departing from the scope of the present disclosure.

The eNB 102 separately encodes and transmits each DCI format in a respective PDCCH. A RNTI configured to UE 116 that a DCI format is intended for, masks a CRC of the DCI format codeword in order to enable UE 116 to identify the DCI format is intended for UE 116. The CRC of (non-encoded) DCI format bits 410 is computed using a CRC computation operation 420, and the CRC is then masked using an exclusive OR (XOR) operation 425 between CRC and RNTI bits 430. The XOR operation 425 is defined as: XOR(0,0)=0, XOR(0,1)=1, XOR(1,0)=1, XOR(1,1)=0. The masked CRC bits are appended to DCI format information bits using a CRC append operation 440, channel coding is performed using a channel coding operation 450 (such as an operation using a convolutional code with tail biting see also REF 2), followed by rate matching 460, scrambling with a UE-specific scrambling sequence 470 (another XOR operation), modulation 480 using for example QPSK, and the modulated symbols of the encoded DCI format are mapped to REs 490 (see also REF 1), and the output control signal 495 is transmitted in a PDCCH. For example, both a CRC and a RNTI include 16 bits.

Figure 5:
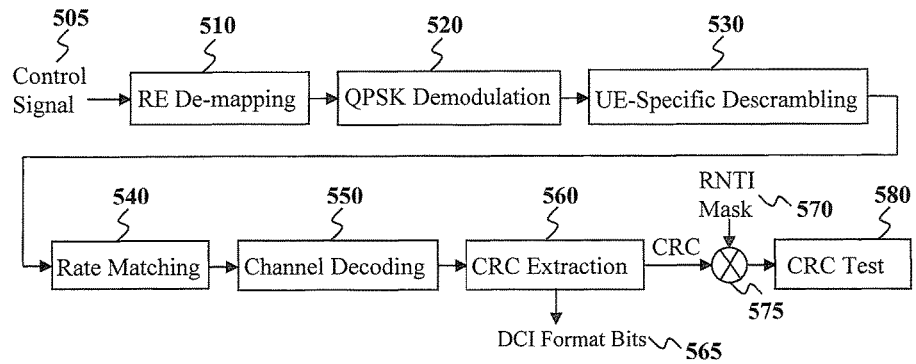
FIG. 5 illustrates an example decoding process for a DCI format according to this disclosure.

FIG. 5 illustrates an example decoding process for a DCI format according to this disclosure. The embodiment of the decoding process shown in FIG. 5 is for illustration only. Other embodiments could be used without departing from the scope of the present disclosure.

UE 116 receives REs for a control signal 505 in a PDCCH, de-maps the REs 510 according to a search space for a PDCCH candidate (see also REF 3), and demodulates received symbols of a presumed DCI format 520. The demodulated symbols are subsequently descrambled by applying an XOR operation with a complex conjugate of a UE-specific scrambling sequence 530. A rate matching applied at eNB 102 transmitter is restored 540 followed by channel decoding 550, such as convolutional decoding with tail biting. After decoding, UE 116 obtains DCI format bits 565 after extracting CRC bits 560. The CRC bits 560 are then de-masked 570 by applying the XOR operation with a RNTI associated with the DCI format 570. Finally, UE 116 performs a CRC check 580. When the CRC check is positive and the contents of the DCI format are valid, UE 116 determines that the DCI format is valid and UE 116 acts according to the DCI format functionality; otherwise, UE 116 disregards the presumed DCI format.

In some wireless networks, UL signals can include data signals conveying information content, control signals conveying UL Control Information (UCI), and RS. UL signals also include a Physical Random Access CHannel (PRACH) that is transmitted by a UE in order to establish or maintain connection with an eNB.

UE 116 transmits data information or UCI through a respective Physical UL Shared CHannel (PUSCH) or a Physical UL Control CHannel (PDCCH) to an eNB, such as eNB 102. When UE 116 simultaneously transmits data information and UCI, UE 116 either multiplexes both in a PUSCH or transmits the data information in a PUSCH and the UCI in a PUCCH (see also REF 3). UCI includes HARQ-ACK information indicating correct or incorrect detection of data Transport Blocks (TBs) in respective PDSCHs, Scheduling Request (SR) information indicating to eNB 102 whether UE 116 has data in its buffer to transmit, and Channel State Information (CSI) enabling eNB 102 to select appropriate parameters for PDSCH or PDCCH transmissions to UE 116. HARQ-ACK information includes a positive Acknowledgement (ACK) in response to a correct PDCCH or data TB detection, a Negative Acknowledgement (NACK) in response to incorrect data TB detection, and an absence of PDCCH detection (DTX) that can be implicit or explicit. A DTX can be implicit when UE 116 does not transmit a HARQ-ACK signal. It is also possible to represent NACK and DTX with a same NACK/DTX state in the HARQ-ACK information (see also REF 3).

CSI includes a Channel Quality Indicator (CQI) that informs eNB 102 of a Transport Block Size (TBS) having a Modulation and Coding Scheme (MCS) that can be received by UE 114 with a predefined target BLock Error Rate (BLER), a Precoding Matrix Indicator (PMI) informing eNB 102 how to combine signals from multiple transmitted antennas in accordance with a Multiple Input Multiple Output (MIMO) transmission principle, and a Rank Indicator (RI) indicating a transmission rank for a PDSCH (see also REF 3). For example, UE 116 can determine a CQI from a Signal-to-Noise and Interference (SINR) measurement while also considering a configured PDSCH TM and the UE 116 receiver characteristics. UL RS can include DMRS and Sounding RS (SRS). DMRS can be transmitted only in a BW of a respective PUSCH or PUCCH and eNB 102 can use a DMRS to demodulate information in a PUSCH or PUCCH. SRS can be transmitted by UE 116 in order to provide eNB 102 with a UL CSI (see also REF 2 and REF 3).

For initial access or for subsequent synchronization purposes, UE 116 can also be configured by eNB 102 to transmit a PRACH.

A Transmission Time Interval (TTI) for DL signaling or for UL signaling is one Sub-Frame (SF). In a TDD communication system, a communication direction in some SFs is in the DL, and a communication direction in some other SFs is in the UL.

Figure 6:
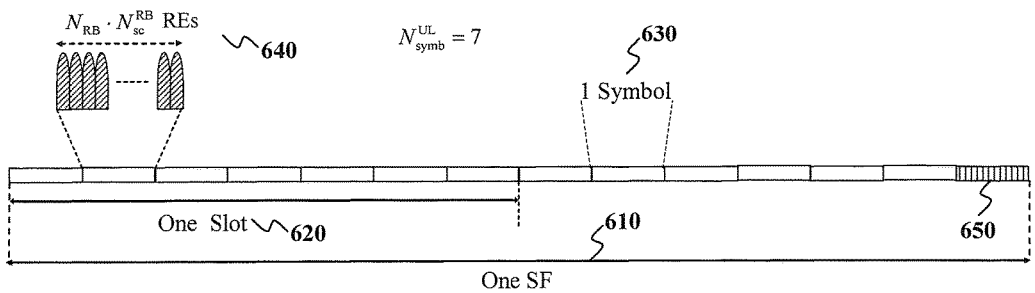
FIG. 6 illustrates an example Uplink (UL) Sub-Frame (SF) structure for Physical Uplink Shared Channel (PUSCH) transmission or for Physical Uplink Control Channel (PUCCH) transmission according to this disclosure.

FIG. 6 illustrates an example UL SF structure for PUSCH transmission or for PUCCH transmission according to this disclosure. The embodiment of the UL SF structure shown in FIG. 6 is for illustration only. Other embodiments could be used without departing from the scope of the present disclosure.

UL signaling can use Discrete Fourier Transform Spread OFDM (DFT-S-OFDM). An UL SF 610 includes two slots. Each slot 620 includes $N_{symb}^{UL}$ symbols 630 where UE 116 transmits data information, UCI, or RS. A transmission BW includes frequency resource units that are referred to as Resource Blocks (RBs). Each RB includes $N_{sc}^{RB}$ (virtual) sub-carriers that are referred to as Resource Elements (REs). UE 116 is assigned $M_{PUSCH}$ RBs 640 for a total of $M_{sc}^{PUSCH} = M_{PUSCH} \cdot N_{sc}^{RB}$ REs for a PUSCH transmission BW. UE 116 is typically assigned $M_{PUCCH}=1$ RB for a PUCCH transmission BW. A transmission unit of 1 RB over 1 SF is referred to as a Physical RB (PRB). A last SF symbol can be used to multiplex SRS transmissions 650 from one or more UEs. A number of UL SF symbols available for data/UCI/DMRS transmission is $N_{symb}^{PUSCH} = 2 \cdot (N_{symb}^{UL} - 1) - N_{SRS} \cdot N_{SRS} = 1$ when a last UL symbol supports SRS transmissions from UEs that overlap at least partially in BW with a PUSCH transmission BW; otherwise, $N_{SRS}=0$.

Figure 7:
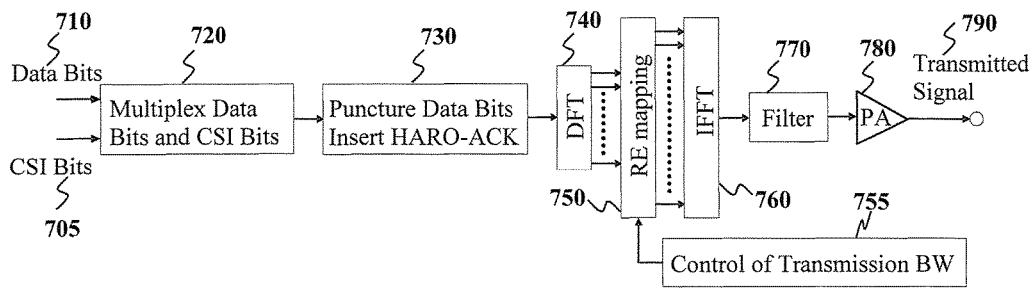
FIG. 7 illustrates an example PUSCH transmitter according to this disclosure.

FIG. 7 illustrates an example PUSCH transmitter according to this disclosure. The embodiment of the PUSCH transmitter shown in FIG. 7 is for illustration only. Other embodiments could be used without departing from the scope of the present disclosure.

Coded CSI bits 705 and coded data bits 710 are multiplexed by multiplexing unit 720. Multiplexing of HARQ-ACK bits is performed by puncturing data bits or CSI bits (if any) 730 in some REs of the two SF symbols next to the SF symbol used to transmit DMRS in each slot (see also REF 2). Discrete Fourier Transform (DFT) filter 740 provides a DFT of combined data bits and UCI bits, selector 755 selects REs for an assigned PUSCH transmission BW 750, Inverse Fast Fourier Transform (IFFT) filter 760 provides IFFT, followed by filtering 770, a power amplifier 780, and finally a signal transmission 790.

Figure 8:
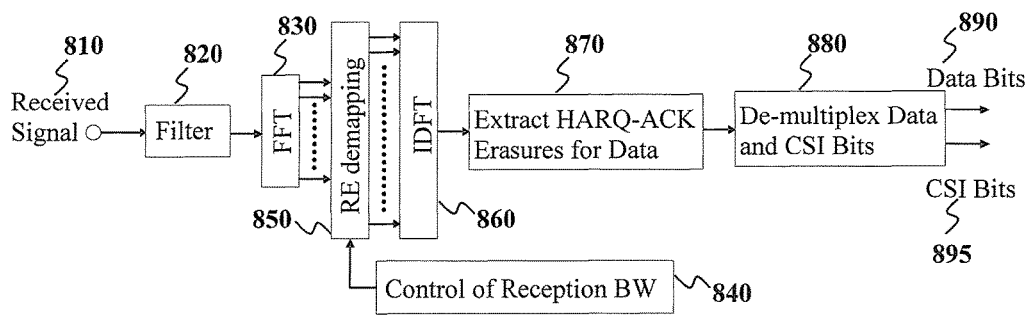
FIG. 8 illustrates an example PUSCH receiver according to this disclosure.

FIG. 8 illustrates an example PUSCH receiver according to this disclosure. The embodiment of the PUSCH receiver shown in FIG. 8 is for illustration only. Other embodiments could be used without departing from the scope of the present disclosure.

A digital signal 810 is filtered by filter 820, FFT filter 830 applies a FFT, selector 840 selects PUSCH REs 850, Inverse DFT (IDFT) filter 860 applies an IDFT, HARQ-ACK extraction unit 870 extracts HARQ-ACK bits and places respective erasures for data bits, and finally de-multiplexer 880 de-multiplexes data bits 890 and CSI bits 895.

For HARQ-ACK transmission in a PUCCH, or for a joint HARQ-ACK and periodic CSI (P-CSI) transmission in a PUCCH, a payload of $O_{HARQ-ACK}$ HARQ-ACK bits or a payload of $O_{HARQ-ACK}$ HARQ-ACK bits and $O_{P-CSI}$ P-CSI bits is encoded using, for example, a block code. In certain embodiments, such as the following case of HARQ-ACK bits, the block code is a $(32, O_{HARQ-ACK})$ Reed-Mueller (RM) code. A tail-biting convolutional code can also be used. For example, UE 116 can use one of the PUCCH formats in REF 1 for a respective functionality.

PUCCH transmitter and receiver structures resemble ones for PUSCH, are well known in the art, and respective descriptions are omitted for brevity.

A power of an UL transmission by UE 116 is controlled by eNB 102 to achieve a desired target for a received SINR while reducing interference to neighboring cells and controlling Interference over Thermal (IoT) noise thereby ensuring respective reception reliability targets. UL Power Control (PC) includes an Open-Loop (OL) component with cell-specific and UE-specific parameters (see also REF 3) and a Closed-Loop (CL) component associated with TPC commands that eNB 102 provides to UE 116 through DCI formats (see also REF 2 and REF 3). A SRS transmission power from UE 116 follows a PUSCH transmission power (see also REF 3).

A PUSCH transmission power $P_{PUSCH,c}(i)$ in decibel per milliwatt (dBm), from UE 116 in SF i for a cell c is given by Equation 1 (see also REF 3)

$$P_{PUSCH,c}(i) = \min\left\{ \begin{array}{c} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm] \quad (1)$$

where $P_{CMAX,c}(i)$ is a maximum transmission power in SF i for cell c configured to UE 116 by eNB 102.

$M_{PUSCH,c}(i)$ is a PUSCH transmission BW expressed in number of RBs valid for SF i and cell c.

$P_{O\_PUSCH,c}(j)$ is a parameter controlling a mean received SINR at eNB 102 and is the sum of a cell-specific component $P_{O\_NOMINAL\_PUSCH}$ and a UE-specific component $P_{O\_UE\_PUSCH}$ that eNB 102 configures to UE 116 by higher layer signaling.

$PL_c$ is a DL path-loss estimate calculated at UE 116 for cell c in dB.

$\alpha_c(j)$ is a cell-specific parameter with $0 \le \alpha_c(j) \le 1$ that eNB 102 configures to UE 116 by higher layer signaling. Fractional TPC is obtained for $\alpha_c(j) < 1$ as the path-loss is not fully compensated. For $\alpha_c(j)=0$, pure CL TPC is provided.

$\Delta_{TF,c}(i)$ is used to enable UL PC based on a spectral efficiency of a PUSCH transmission and can also be set to zero.

$f_c(i) = f_c(i-1) + \delta_{PUSCH,c}(i - K_{PUSCH})$ is a function accumulating a CL TPC command $\delta_{PUSCH}(i)$ included in a DL Control Information (DCI) format scheduling a PUSCH transmission in SF i, or in a TPC channel, such as DCI format 3/3A, in a PDCCH with $f(0)$ being a first value after reset of accumulation.

A PUCCH transmission power $P_{PUCCH}(i)$ from UE 116 in SF i for a cell c is given by Equation 2 (see also REF 3)

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F)\Delta_{TxD}(F') + g(i) \end{Bmatrix} [dBm] \quad (2)$$

where
- $P_{O\_PUCCH}$ is a sum of a cell-specific parameter $P_{O\_NOMINAL\_PUCCH}$ and a UE-specific parameter $P_{O\_UE\_PUCCH}$ that are configured to UE 116 from eNB 102 by higher layer signaling.
- $h(\cdot)$ is a function with values depending on whether HARQ-ACK, SR, or CSI is transmitted.
- $\Delta_{F\_PUCCH}(F)$ is configured from eNB 102 to UE 116 by higher layer signaling and its value depends on a respective PUCCH format (F).
- $\Delta_{TxD}(F)$ is non-zero when a PUCCH format F' is transmitted from two antenna ports.
- $g(i)=g(i-1)+\delta_{PUCCH}(i)$ is a function accumulating a CL TPC command $\delta_{PUCCH}(i)$ conveyed by a DCI Format 3/3A or in a DCI format scheduling PDSCH reception and g(0) is a value after reset of accumulation.

A SRS transmission power $P_{SRS,c}(i)$ from UE 116 in SF i for a cell c is given by Equation 3 (see also REF 3)

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}[dBm] \quad (3)$$

where
- $P_{SRS\_OFFSET,c}$ is a UE-specific parameter configured from eNB 102 by higher layer signaling (see also REF 3).
- $M_{SRS,c}$ is a SRS transmission BW expressed in a number of RBs.

A PRACH transmission power $P_{PRACH,c}(i)$ from UE 116 in SF i for a cell c is given by Equation 4 (see also REF 3)

$$P_{PRACH,c}(i) = \min\{P_{CMAX,c}(i), \text{Target} + PL_c\} [dBm] \quad (4)$$

where "Target" is a PREAMBLE_RECEIVED_TARGET_POWER parameter that is configured to UE 116 from eNB 102 by higher layer signaling.

UE 116 can indicate to eNB 102 an amount of power that UE 116 has in addition to a power used for a current transmission through a Power Headroom Report (PHR). A PHR can be of Type 1 or Type 2 and can respectively be with respect to a PUSCH transmission where the PHR is sent when UE 116 does not transmit PUSCH and PUCCH in a same SF or with respect to both a PUSCH transmission and a PUCCH transmission when UE 116 transmits both a PUSCH and a PUCCH in a same SF of a cell (see also REF 3). A positive PHR value indicates that UE 116 can increase its transmission power while a negative PHR value indicates that UE 116 is power limited. The PHR is included in a Medium Access Control (MAC) element that is transmitted from UE 116 as part of its data in a PUSCH.

One mechanism towards satisfying a demand for increased network capacity and data rates is network densification. This is realized by deploying small cells in order to increase a number of network nodes and their proximity to UEs and provide cell splitting gains. As a number of small cells increases and deployments of small cells become dense, a handover frequency and a handover failure rate can also significantly increase. UE 116 can maintain its Radio Resource Control (RRC) connection to a macro cell that provides a large coverage area and UE 116 can also have a simultaneous connection to a small cell for data offloading. Such dual connection can avoid frequent handovers while allowing for high data rates. By maintaining the RRC connection to the macro-cell, communication with the small cell can be optimized as control-place (C-place) functionalities such as mobility management, paging, and system information updates can be provided only by the macro-cell while a small-cell can be dedicated for user-data plane (U-plane) communications.

An important aspect of a dual connection for UE 116 to an eNB of a macro-cell, such as eNB 102, and an eNB of a small cell, such as eNB 103, is a latency of a backhaul link between eNB 102 and eNB 103. When the latency of the backhaul link is practically zero, the operation is referred to as Carrier Aggregation (CA) and scheduling decisions can be made by a central entity and conveyed to each network node when the network nodes are not collocated, as in the example of eNB 102 and eNB 103. In such case, eNB 102 and eNB 103 can be viewed as a same eNB and respective nodes can be considered as belonging to a single group. It is also possible for the network nodes to be collocated. Moreover, feedback from UE 116 can be received at any network node and conveyed without material latency to the central entity to facilitate a proper scheduling decision for UE 116. However, when the latency of the backhaul link is practically not zero, it is not feasible to use a central scheduling entity as the latency of the backhaul link will accumulate each time there is communication between a network node and the central scheduling entity thereby introducing unacceptable delay for a UE communication. Then, it is necessary that scheduling decisions are performed at each network node. Also, feedback signaling from UE 116 associated with scheduling from a network node needs to be received by the same network node. The operation with non-zero backhaul latency is referred to as Dual Connectivity (DC).

For CA operation with a single group of cells or nodes and for a SF i, UE 116 first allocates power to a PRACH transmission, if any, and adjusts $P_{CMAX}(i)$ as $\hat{P}_{CMAX}(i) = \hat{P}_{CMAX}(i) - \hat{P}_{PRACH}(i)$ where $\hat{P}$ the linear value of a transmission power P in dBm (when UE 116 does not have PRACH transmission in SF i, $\hat{P}_{PRACH}(i)=0$). Subsequently, UE 116 allocates power $\hat{P}_{PUCCH}(i)$ to a PUCCH transmission, if any. When UE 116 does not transmit PUCCH in SF i $\hat{P}_{PUCCH}(i)=0$. Subsequently, when $\hat{P}_{CMAX}(i)-\hat{P}_{PUCCH}(i)>0$ and for PUSCH in a cell j that conveys UCI, if any, UE 116 allocates a power $P_{PUSCH,j}(i)$ according to $\hat{P}_{PUSCH,j}(i)=\min(\hat{P}_{PUSCH,j}(i),(\hat{P}_{CMAX}(i)-\hat{P}_{PUCCH}(i)))$. When $P_{CMAX}(i)-\hat{P}_{PUCCH}(i)-\hat{P}_{PUSCH,j}(i)>0$, UE 116 scales a nominal transmission power of each remaining PUSCH transmission by a same factor w(i) so that $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)),$$

where $0 \leq w(i) \leq 1$. When $$\sum_{c \neq j} \hat{P}_{PUSCH,c}(i) > (\hat{P}_{CMAX}(i) - \hat{P}_{PUCCH}(i) - \hat{P}_{PUSCH,j}(i)),$$

UE 116 can set w(i)=0 for one or more of remaining PUSCH transmissions (see also REF 3). When UE 116 is configured to transmit P-CSI on a PUCCH and aperiodic CSI (A-CSI)

on a PUSCH in SF i, UE 116 transmits only A-CSI and does not transmit P-CSI in SF i (see also REF 3).

For CA operation, UE 116 can determine a resource to transmit a PUCCH conveying HARQ-ACK information from a set of resources configured from eNB 102 to UE 116 by higher layer signaling such as Radio Resource Control (RRC) signaling and from a field in at least one of the DCI formats scheduling respective PDSCH transmissions to UE 116 that indicates a resource from the set of configured resources (see also REF 3). For Frequency Domain Duplex (FDD) operation, the field is the TPC field in DCI formats scheduling respective PDSCH transmissions in Secondary Cells (SCells) while the TPC field in the DCI format scheduling PDSCH transmission in a Primary Cell (PCell) provides a TPC command for the PUCCH transmission (see also REF 2 and REF 3). For Time Domain Duplex (TDD) operation, the field is again the TPC field in DCI formats scheduling respective PDSCH transmissions in SCells but also on a PCell in SFs where a DL Assignment Index (DAI) in the DCI formats has a value larger than one while the TPC field in the DCI format scheduling PDSCH transmission in a PCell and having a DAI field with value equal to one provides a TPC command for the PUCCH transmission (see also REF 2 and REF 3).

One difference between CA operation and DC operation is on UCI transmissions. For CA of a cell group, UE 116 can multiplex UCI either in a PUCCH transmitted on a PCell of the cell group or in a PUSCH transmitted on any cell from the cell group. For DC, the non-zero backhaul latency between MeNB and SeNB cannot be accommodated by UCI functionality and for this reason UCI for one or more cells of the MeNB is transmitted on a cell of the MeNB and UCI for one or more cells of the SeNB is transmitted on a cell of the SeNB. In the following, cells served by a MeNB are referred to a Master Cell Group (MCG) and cells served by a SeNB are referred to as Secondary Cell Group (SCG).

Another difference between CA operation and DC operation is on the operation of UL power control. With CA, as a same scheduling entity can coordinate UL transmissions, UE 116 can use up to a maximum configured transmission power $P_{CMAX}(i)$ in SF i for transmissions on all respective cells. For DC, due to the non-zero backhaul latency between MeNB and SeNB, the respective schedulers are independent and scheduling can be such that UE 116 can require a total power for transmissions on all cells of the MCG and all cells of the SCG in SF i that exceeds $P_{CMAX}(i)$. Then, some transmissions have to be suspended or use a reduced power.

To minimize a probability of power limited operation in DC and improve reliability for some transmissions with small information payload, eNB 102 can configure UE 116 a minimum available power for transmissions on the MCG, $P_{MCG,reserve}$, and a minimum available power for transmissions on the SCG, $P_{SCG,reserve}$ ($P_{MCG,reserve}$, $P_{SCG,reserve}$, and $P_{MCG,reserve}+P_{SCG,reserve}$ are smaller than or equal to $P_{CMAX}(i)$—see also REF 5). The configuration of $P_{MCG,reserve}$ and of $P_{SCG,reserve}$ can be as a percentage of $P_{CMAX}(i)$ and therefore depend on SF i ($P_{MCG,reserve}(i)$ and $P_{SCG,reserve}(i)$). Power scaling of transmissions from UE 116 in SF i can occur when a total required power for transmissions on MCG exceeds $P_{MCG,reserve}(i)$ or when a total required power for transmissions on SCG exceeds $P_{SCG,reserve}(i)$ and the total required power for transmissions on both MCG and SCG exceeds $P_{CMAX}(i)$. When transmissions from UE 116 on MCG or on SCG in SF i require a total power larger than $P_{MCG,reserve}(i)$ or $P_{SCG,reserve}(i)$, respectively, and a total required power for transmissions on both MCG and SCG does not exceed $P_{CMAX}(i)$, a total power larger than $P_{MCG,reserve}(i)$ or $P_{SCG,reserve}(i)$ can be used for transmissions on MCG or on SCG.

Yet another difference between CA operation and DC operation is that for DC, unlike CA, cross-carrier scheduling cannot be performed from a MCG cell to a SCG cell (or the reverse). Cross-carrier scheduling refers to the operation where a PDCCH conveying a DCI format scheduling, for example, a PDSCH transmission in a second cell is transmitted in a first cell.

A drawback of the UCI transmission mechanism for other CA operations is that all PUCCH transmissions from UE 116 occur on a PCell. Although the PCell is UE-specific, in practice the PCell can be same for most UEs. For example, in a network consisting of a macro-cell providing mobility support and of many small cells providing data traffic off-loading for the macro-cell, the PCell can be the macro-cell for all UEs requiring mobility support. Then, the total UL resources required on the PCell (macro-cell) for PUCCH transmissions can be a significant percentage of the total UL resources on the macro-cell while the UL resources in small cells remain mostly unutilized for PUCCH transmissions. To circumvent this drawback, a concept similar to DC operation can apply in CA operation for PUCCH transmissions where cells configured to UE 116 in CA operation can be separated in a MCG and a SCG and, for cells in the SCG, UE 116 transmit PUCCH on a Primary SCell (PSCell) in the SCG.

A first consequence from supporting PUCCH transmissions from UE 116 in CA operation on both a PCell and a PSCell is a requirement to prioritize power allocation to PUCCH or PUSCH transmissions, or for transmissions on the MCG or the SCG, when UE 116 requires a total transmission power in a SF i that exceeds $P_{CMAX}(i)$.

A second consequence is that, unlike DC operation where DCI format 3/3A transmission is supported on a PSCell of a SCG, existing CA mechanisms do not support signaling of TPC commands for PUCCH transmissions on a PSCell, or for PUSCH transmissions on SCG cells that are not scheduled by a PDCCH, as TPC commands provided by a DCI Format 3/3A are applicable only for PUCCH transmissions on a PCell, or for PUSCH transmissions on the MCG that are not scheduled by respective PDCCHs. The eNB 102 transmits a DCI Format 3/3A only in resources of a UE-common search space on the PCell (see also REF 3). TPC commands for PUCCH transmissions through a DCI Format 3/3A are particularly beneficial for periodic UCI transmissions from UE 116 that are not associated with a detection of a DCI format scheduling a PDSCH reception, or for PUSCH transmissions that are not scheduled by a DCI format such as a semi-persistently scheduled PUSCH transmission from UE 116 or a PUSCH transmission triggered by a reception of a negative acknowledgement by UE 116.

A third consequence is an increase in transmission power requirements and spectral emissions as UE 116 can transmit more channels in a SF i than for CA operation without a SCG due to an additional PUCCH transmission on a PSCell of the SCG.

One or more embodiments of this disclosure provide mechanisms for enabling a network to configure parameters to a UE for controlling a power of transmissions from the UE on a first cell group or on a second cell group depending on a communication delay between the first cell group and the second cell group. One or more embodiments of this disclosure also provide mechanisms for a UE configured with a first cell group and a second cell group in CA operation to determine whether or not to transmit a channel conveying UCI when the UE needs to reduce a respective nominal transmission power. One or more embodiments of this disclosure also provide mechanisms for a network to transmit and for a UE to receive a TPC command from a DCI Format 3/3A for a PUCCH transmission or for a PUSCH transmission on a cell of a first cell group or on a cell of a second cell group that are configured to the UE for CA operation. Finally, one or more embodiments of this disclosure provide mechanisms for reducing a number of channels that a UE transmits to convey UCI when the UE is configured for CA operation, PUCCH transmission on a cell of a first cell group, and PUCCH transmission on a cell of a second cell group.

In the following, similar to other CA operations, a PRACH transmission from a UE, such as UE 116, is assumed to be always prioritized for power allocation over any other channel or signal transmission from UE 116 as the PRACH is the fundamental channel for UE 116 to maintain its connection with a network.

Although not a restriction for the embodiments of this disclosure, it is generally assumed for the brevity of descriptions that when UE 116 transmits a PUSCH in a cell of a Cell Group (CG), UE 116 does not transmit PUCCH in a same or different cell of the CG in a same SF. Additionally, although UE 116 can generate HARQ-ACK information in response to a detection of a DCI format indicating a release of a Semi-Persistently Scheduled (SPS) PDSCH (see also REF 3), for brevity this is not explicitly mentioned and the following descriptions consider that UE 116 generates HARQ-ACK information in response to PDCCH detections scheduling respective PDSCH transmissions or in response to SPS PDSCH.

Embodiment 1:UL Transmission Power

The first embodiment considers a determination by UE 116 with CA operation of a power for a PUSCH transmission or for a PUCCH transmission on a cell of a MCG or on a cell of a SCG. Unlike DC operation, a single scheduling entity can exist for CA operation as either transmission points to UE 116 are co-located or a latency of a backhaul link among transmission points is practically negligible. Then, there is no need for an eNB 102 to configure UE 116 for reservation of a transmission power for the MCG or for reservation of a transmission power for the SCG in a SF i. Equivalently, $P_{MCG,reserve}(i)=0$ and $P_{SCG,reserve}(i)=0$.

UE 116 first determines a power for a channel or signal transmission, for example according to Equation 1 for a PUSCH, Equation 2 for a PUCCH, or Equation 3 for a SRS, or Equation 4 for a PRACH. Each such transmission power is referred to as nominal transmission power for the respective channel or signal. In the following, UE 116 is assumed to not have a PRACH transmission in a SF i; otherwise, $\hat{P}_{CMAX}(i)$ can be replaced by $\hat{P}_{CMAX}(i)-\hat{P}_{PRACH}(i)$ as UE 116 prioritizes power allocation to PRACH transmissions where $\hat{P}_{PRACH}(i)$ is a total power for PRACH transmissions on MCG and SCG in SF i.

When a total of the nominal transmission powers for UE 116 in a SF i would not exceed $\hat{P}_{CMAX}(i)$, UE 116 transmits each channel or signal with its nominal power (that is, an actual transmission power is same as a nominal transmission power). When a total of the nominal transmission powers for UE 116 in a SF i would exceed $\hat{P}_{CMAX}(i)$, UE 116 needs to reduce, including to zero, an actual transmission power of at least one channel or signal. In the following, this is further considered depending on whether UE 116 transmits UCI on the MCG or on the SCG in SF i and it is always assumed that the total of the nominal transmission powers in SF i would exceed $\hat{P}_{CMAX}(i)$.

UE Transmits UCI Only in a PUCCH Either on PCell or on PSCell

When UE 116 does not multiplex UCI in any PUSCH transmission in SF i and UE 116 does not have PUCCH transmissions on both PCell and PSCell, UE 116 scales $\hat{P}_{PUSCH,c}(i)$ (including to zero) such that the condition in Equation 5 is satisfied $$\sum_c w(i) \cdot \hat{P}_{PUSCH,c}(i) \le \hat{P}_{CMAX}(i) - \hat{P}_{PUCCH\_x}(i) \quad (5)$$

where x=0 when UE 116 transmits PUCCH on the PCell, x=1 when UE 116 transmits PUCCH on the PSCell, $\hat{P}_{PUCCH,x}(i)$, $\hat{P}_{PUSCH,c}(i)$, $\hat{P}_{CMAX}(i)$ are the linear values of $P_{PUCCH,x}(i)$ $P_{PUSCH,c}(i)$, and $P_{CMAX}(i)$ in SF i, respectively, and w(i) is a scaling factor of $\hat{P}_{PUSCH,c}(i)$ for cell c with $0 \le w(i) \le 1$. When UE 116 does not transmit PUCCH in SF i, $\hat{P}_{PUCCH,x}(i)=0$.

UE Transmits UCI Only in PUCCHs on PCell and on PSCell

When UE 116 does not multiplex UCI in any PUSCH transmission in SF i and UE 116 transmits PUCCH on both PCell and PSCell and when $\hat{P}_{PUCCH,0}(i)+\hat{P}_{PUCCH,1}(i) \le \hat{P}_{CMAX}(i)$, UE 116 scales $\hat{P}_{PUSCH,c}(i)$ such that the condition in Equation 6 is satisfied $$\sum_c w(i) \cdot \hat{P}_{PUSCH,c}(i) \le \hat{P}_{CMAX}(i) - \hat{P}_{PUCCH\_0}(i) - \hat{P}_{PUCCH\_1}(i) \quad (6)$$

Figure 9:
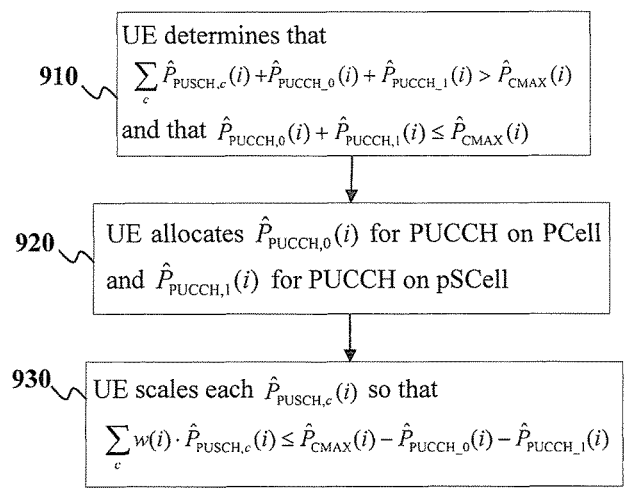
FIG. 9 illustrates a power allocation by a UE in a SF when the UE has a PUCCH transmission on a Primary Cell (PCell), a PUCCH transmission on a Primary-Secondary Cell (PSCell), PUSCH transmissions that do not include UCI, and a total nominal transmission power for the UE exceeds a maximum transmission power in the SF according to this disclosure.

FIG. 9 illustrates a power allocation by a UE in a SF when the UE has a PUCCH transmission on a PCell, a PUCCH transmission on a PSCell, PUSCH transmissions that do not include UCI, and a total nominal transmission power for the UE exceeds a maximum transmission power in the SF according to this disclosure.

In a SF i, UE 116 determines a nominal power for a PUCCH transmission on a PCell, $\hat{P}_{PUCCH,0}(i)$, a nominal power for a PUCCH transmission on a PSCell, $\hat{P}_{PUCCH,1}(i)$ and nominal powers for respective PUSCH transmissions that do not include UCI. UE 116 further determines that a total nominal transmission power for PUCCH and PUSCH transmissions in SF i exceeds $\hat{P}_{CMAX}(i)$ and that $\hat{P}_{PUCCH,0}(i)+\hat{P}_{PUCCH,1}(i) \le \hat{P}_{CMAX}(i)$ 910. UE 116 first allocates a nominal transmission power for the PUCCH on the PCell, $\hat{P}_{PUCCH,0}(i)$, and a nominal transmission power for the PUCCH on the PSCell, $\hat{P}_{PUCCH,1}(i)$ 920. UE 116 subsequently scales by w(i) the nominal PUSCH transmission powers, including by w(i)=0 for some PUSCHs, so that $$\sum_c w(i) \cdot \hat{P}_{PUSCH,c}(i) \le \hat{P}_{CMAX}(i) - \hat{P}_{PUCCH\_0}(i) - \hat{P}_{PUCCH\_1}(i) 930.$$

When UE 116 does not multiplex UCI in any PUSCH transmission in SF i, for example when UE 116 does not have any PUSCH transmission in SF i, and UE 116 has PUCCH transmissions on both PCell and PSCell and when $\hat{P}_{PUCCH,0}(i)+\hat{P}_{PUCCH,1}(i) > \hat{P}_{CMAX}(i)$, the following alternatives are considered.

In a first alternative, UE 116 does not transmit one of the two PUCCHs and scales $\hat{P}_{PUSCH,c}(i)$ to satisfy the condition in Equation 5 where $\hat{P}_{PUCCH\_x}(i)$ is the nominal power for the transmitted PUCCH. The selection by UE 116 of the PUCCH to transmit can depend on the UCI type and can be either predetermined or configured by the network. For example, in a predetermined manner, transmission of HARQ-ACK/SR can be prioritized over transmission of CSI. When UE 116 has a same UCI type to transmit on the MCG and the SCG, UCI transmission on the MCG can be prioritized.

In a second alternative, UE 116 transmits a first PUCCH with its nominal power, transmits a second PUCCH with reduced power, and does not transmit any other channel or signal. The selection of the first PUCCH and of the second PUCCH can be as in the first alternative (predetermined according to respective UCI types or configured by eNB 102). An actual transmission power of the second PUCCH is given as $\hat{P}_{PUCCH\_y\_reduced}(i)\hat{P}_{CMAX}(i)-\hat{P}_{PUCCH\_x}$ where x is different than y.

UE 116 can also select between the first and second alternatives. For example, when UE 116 determines that a power reduction for the second PUCCH is significant enough for eNB 102 to incorrectly detect with a large probability a UCI in the second PUCCH, UE 116 can apply the first alternative; otherwise, UE 116 can apply the second alternative.

UE Transmits UCI in a PUSCH and UCI in a PUCCH

When, in SF i, UE 116 has a PUSCH transmission with UCI on cell $j_{x_1}$ in CG $x_1$ and a PUCCH transmission in CG $x_2$, where $x_1$ is different than $x_2$, and when $$\hat{P}_{PUCCH,x}(i) + \hat{P}_{PUSCH,j_{x_1}}(i) > \hat{P}_{CMAX}(i),$$

UE 116 scales $\hat{P}_{PUSCH,c}(i)$ so that the condition in Equation 7 is satisfied.

$$\sum_{c \neq j} w(i) \cdot \hat{P}_{PUSCH,c}(i) \leq \hat{P}_{CMAX}(i) - \hat{P}_{PUCCH,x_2}(i) - \hat{P}_{PUSCH,j_{x_1}}(i) \quad (7)$$

When $$\hat{P}_{PUCCH,x_2}(i) + \hat{P}_{PUSCH,j_{x_1}}(i) > \hat{P}_{CMAX}(i),$$

the following alternatives are considered.

In a first alternative, UE 116 does not transmit either the PUSCH with UCI or the PUCCH. The selection of whether to transmit the PUSCH with UCI or the PUCCH can be predetermined based on the respective UCI type or can be configured by eNB 102. For example, transmission of HARQ-ACK can be prioritized over transmission of CSI, or transmission of SR (in a PUCCH) can be prioritized over transmission of A-CSI (in a PUSCH). When UE 116 has a same UCI type to transmit on the MCG and the SCG, UE 116 prioritizes UCI transmission to the MCG. Therefore, when UE 116 is configured to transmit A-CSI or P-CSI on MCG and P-CSI or A-CSI on SCG in SF i, respectively, unlike when UE 116 is configured for CA operation with a single CG where UE 116 transmits only A-CSI and does not transmit P-CSI in SF i, UE 116 transmits both P-CSI to MCG or SCG and A-CSI to SCG or MCG, respectively, and UE 116 prioritizes power allocation to P-CSI transmission on the PCell of the MCG over A-CSI transmission in a PUSCH on a cell of the SCG.

When after UE 116 drops a transmission of the PUSCH with UCI, it is $$\sum_{c \neq j} \hat{P}_{PUSCH,c}(i) \leq \hat{P}_{CMAX}(i) - \hat{P}_{PUCCH,x_2}(i),$$

UE 116 can transmit all other channels with their respective nominal power; otherwise, when UE 116

$$\sum_{c \neq j} \hat{P}_{PUSCH,c}(i) > \hat{P}_{CMAX}(i) - \hat{P}_{PUCCH,x_2}(i),$$

scales each PUSCH transmission power so that $$\sum_{c \neq j} w(i) \cdot \hat{P}_{PUSCH,c}(i) \leq \hat{P}_{CMAX}(i) - \hat{P}_{PUCCH,x_2}(i).$$

When after UE 116 drops a transmission of the PUCCH, it is $$\sum_{c \neq j} \hat{P}_{PUSCH,c}(i) \leq \hat{P}_{CMAX}(i) - \hat{P}_{PUSCH,j_{x_1}}(i),$$

UE 116 can transmit all other channels with their respective nominal power; otherwise, when UE 116

$$\sum_{c \neq j} \hat{P}_{PUSCH,c}(i) > \hat{P}_{CMAX}(i) - \hat{P}_{PUSCH,j_{x_1}}(i),$$

scales each PUSCH transmission power so that $$\sum_{c \neq j} w(i) \cdot \hat{P}_{PUSCH,c}(i) \leq \hat{P}_{CMAX}(i) - \hat{P}_{PUSCH,j_{x_1}}(i).$$

In a second alternative, UE 116 transmits both the PUSCH with UCI and the PUCCH and does not transmit any other channel or signal. Either the PUCCH or the PUSCH with UCI is transmitted with reduced power. The selection of the channel to transmit with reduced power can depend on the respective UCI type, as described above, or can be configured by eNB 102, or can be always the PUSCH.

When UE 116 transmits the PUSCH with reduced power when UE 116 is power limited, eNB 102 may discard HARQ-ACK information in the PUSCH when eNB 102 incorrectly receives a data TB transmitted in the PUSCH (when HARQ-ACK information is not protected by CRC and eNB 102 cannot know whether it is correctly or incorrectly detected). When UE 116 transmits only A-CSI in the PUSCH with UCI, UE 116 reduces a respective transmission power as eNB 102 can determine an incorrect A-CSI reception based on a respective CRC check.

When UE 116 reduces a transmission power of the PUSCH with UCI, a respective actual transmission power can be determined as $$\hat{P}_{PUSCH,j_{x_1},reduced}(i) \le \hat{P}_{CMAX}(i) - \hat{P}_{PUCCH,x_2}(i).$$

When UE 116 reduces a transmission power of the PUCCH, a respective actual transmission power can be determined as $$\hat{P}_{PUCCH,x_2,reduced}(i) \le \hat{P}_{CMAX}(i) - \hat{P}_{PUSCH,j_{x_1}}(i).$$

UE 116 also selects between the first and second alternatives. For example, when UE 116 determines that a power reduction for the PUCCH or the PUSCH, according to PUCCH or PUSCH prioritization based on UCI type or based on the MCG when a UCI type with higher priority is same, is significant enough for eNB 102 to incorrectly detect with a large probability a respective UCI, UE 116 applies the first alternative; otherwise, UE 116 applies the second alternative.

Figure 10:
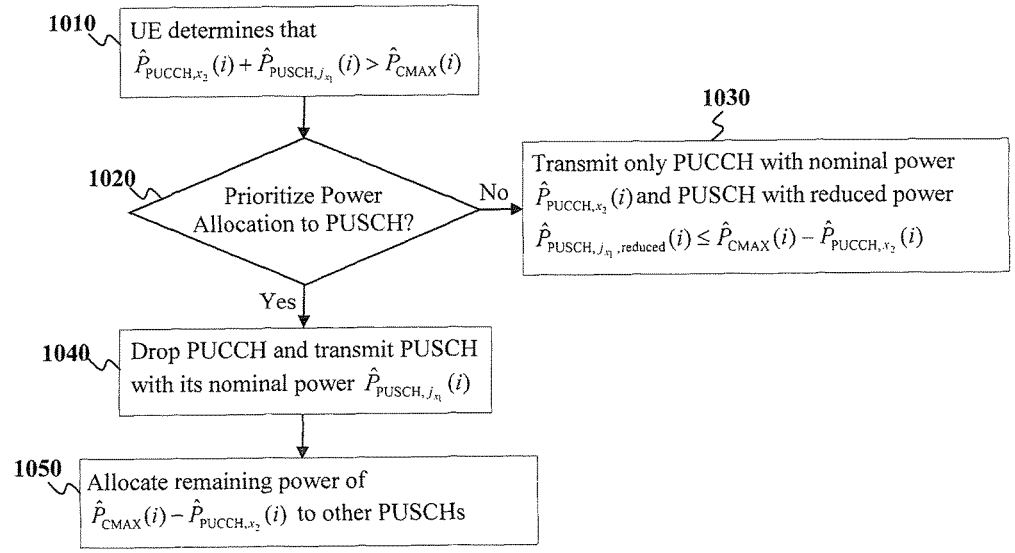
FIG. 10 illustrates an exemplary power allocation by a UE in a SF when the UE has a PUCCH transmission, a PUSCH transmission that includes UCI, other PUSCH transmissions, and a sum of a nominal power for the PUCCH transmission and of a nominal power for the PUSCH transmission that includes UCI exceeds a maximum transmission power in the SF according to this disclosure.

FIG. 10 illustrates an exemplary power allocation by a UE in a SF when the UE has a PUCCH transmission, a PUSCH transmission that includes UCI, other PUSCH transmissions, and a sum of a nominal power for the PUCCH transmission and of a nominal power for the PUSCH transmission that includes UCI exceeds a maximum transmission power in the SF according to this disclosure.

UE 116 determines, in a SF i, a nominal power for a PUCCH transmission, $\hat{P}_{PUCCH,x_2}(i)$, a nominal power for a PUSCH transmission with UCI, $\hat{P}_{PUSCH,j_n}(i)$, and nominal powers for other PUSCH transmissions that do not include UCI. UE 116 further determines that $$\hat{P}_{PUCCH,x_2}(i) + \hat{P}_{PUSCH,j_{x_1}}(i) > \hat{P}_{CMAX}(i) \; 1010.$$

Depending on the UCI type, or on the MCG priority in case of same UCI with highest priority on MCG and SCG, UE 116 can determine 1020 whether or not to transmit the PUCCH with its nominal power, $\hat{P}_{PUCCH,x_2}(i)$ and transmit the PUSCH with a reduced power of $$\hat{P}_{PUSCH,j_{x_1},reduced}(i) \le \hat{P}_{CMAX}(i) - \hat{P}_{PUCCH,x_2}(i)$$

1030, for example when the PUCCH includes HARQ-ACK/SR and the PUSCH includes only A-CSI, or drop/power scale the PUCCH transmission and transmit the PUSCH with its nominal power $$\hat{P}_{PUSCH,j_{x_1}}(i)$$

1040, for example when the PUSCH transmission includes HARQ-ACK and the PUCCH includes P-CSI. UE 116 can allocate a remaining power of $\hat{P}_{CMAX}(i) - \hat{P}_{PUCCH,x_2}(i)$ to other PUSCH transmissions 1050 that have their power additionally scaled when $$\sum_{c \ne j} \hat{P}_{PUSCH,c}(i) > \hat{P}_{CMAX}(i) - \hat{P}_{PUCCH,x_2}(i).$$

UE Transmits UCI in a PUSCH on a MCG Cell and in a PUSCH on a SCG Cell

When UE 116 has a PUSCH transmission with UCI on MCG cell $j_1$ and a PUSCH transmission with UCI on SCG cell $j_2$ and when $\hat{P}_{PUSCH,j_1}(i) + \hat{P}_{PUSCH,j_2}(i) \le \hat{P}_{CMAX}(i)$, UE 116 scales $\hat{P}_{PUSCH,c}(i)$ so that the condition in Equation 8 is satisfied.

$$\sum_{c \ne j} w(i) \cdot \hat{P}_{PUSCH,c}(i) \le \hat{P}_{CMAX}(i) - \hat{P}_{PUSCH,j_1}(i) - \hat{P}_{PUSCH,j_2}(i) \quad (8)$$

When $\hat{P}_{PUSCH,j_1}(i) + \hat{P}_{PUSCH,j_2}(i) > \hat{P}_{CMAX}(i)$, the following alternatives are considered.

In a first alternative, UE 116 does not transmit either the PUSCH with UCI on MCG cell $j_1$ or the PUSCH with UCI on SCG cell $j_2$. The selection of the PUSCH with UCI to transmit by UE 116 can depend on the UCI type conveyed in the two PUSCHs, with a prioritization as previously described and where for a same UCI type with highest priority the MCG is prioritized, or can be configured by the network for each UCI type. When after dropping a transmission of a PUSCH with UCI, a total nominal transmission power for remaining PUSCHs is less than or equal to $\hat{P}_{CMAX}(i)$, UE 116 transmits the remaining PUSCHs with their nominal power. When after dropping a transmission of a PUSCH with UCI a total nominal transmission power for remaining PUSCHs exceeds $\hat{P}_{CMAX}(i)$, UE 116 scales each $\hat{P}_{PUSCH,c}(i)$ without UCI so that the condition $$\sum_{c \ne j_1, j_2} w(i) \cdot \hat{P}_{PUSCH,c}(i) \le \hat{P}_{CMAX}(i) - \hat{P}_{PUSCH,j_x}(i)$$

is satisfied, where x=1 or x=2.

In a second alternative, UE 116 transmits one PUSCH with UCI on cell $j_{x_1}$ with its nominal power and transmits the other PUSCH with UCI on cell $j_{x_2}$ with reduced power $$\hat{P}_{PUSCH,j_{x_2},reduced}(i) = \hat{P}_{CMAX}(i) - \hat{P}_{PUSCH,j_{x_1}}(i),$$

where $x_1$ is different than $x_2$. The selection for the PUSCH with UCI to transmit with its nominal power can be based on the UCI type, as previously described, or can be configured to UE 116 by the network for each UCI type. UE 116 does not transmit other PUSCH, if any.

In a third alternative, the first and second alternatives can be combined as $$\sum_{c \ne j_x} w(i) \cdot \hat{P}_{PUSCH,c}(i) \le \hat{P}_{CMAX}(i) - \hat{P}_{PUSCH,j_{x_1}}(i)$$

where it can be a UE implementation choice or a network configuration to UE 116 whether to set w(i)=0 for cell $j_{x_2}$, or to set $$w(i) \le \left(\hat{P}_{CMAX}(i) - \hat{P}_{PUSCH,j_{x_1}}(i)\right) / \hat{P}_{PUSCH,j_{x_2}}(i)$$

for cell $j_{x_2}$, and set w(i)=0 for all other cells. For example, when UE 116 determines that a power reduction for the first PUSCH or for the second PUSCH, according to a prioritization based on UCI type or based on the MCG when a UCI type with higher priority is same, is significant enough for eNB 102 to incorrectly detect with a large probability a respective UCI, UE 116 can apply the first alternative; otherwise, UE 116 can apply the second alternative. For example, when a UCI such as an A-CSI in a PUSCH transmission that needs to be power reduced is protected by CRC, UE 116 can transmit the PUSCH with reduced power; otherwise, when a UCI such as a HARQ-ACK in a PUSCH transmission that needs to be power reduced is not protected by CRC, UE 116 can drop the PUSCH transmission.

Figure 11:
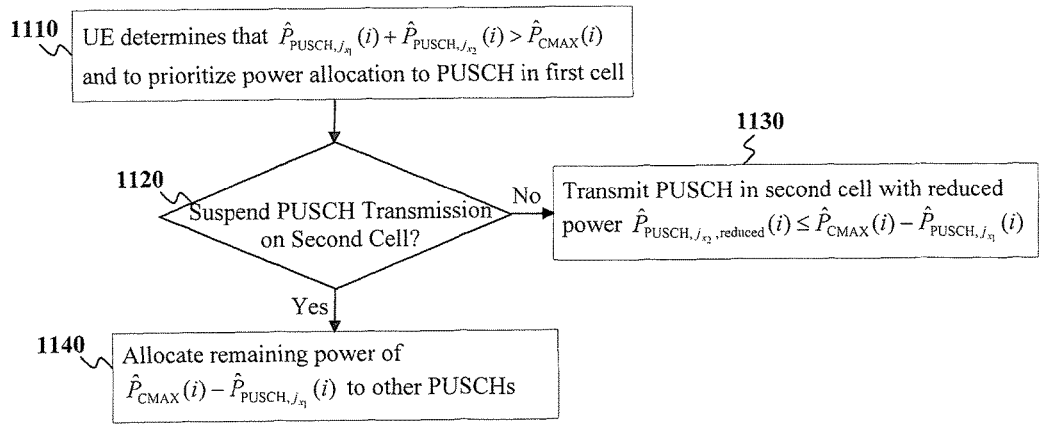
FIG. 11 illustrates an exemplary power allocation by a UE in a SF when the UE has a first PUSCH transmission that includes UCI, a second PUSCH transmission that includes UCI, other PUSCH transmissions, and a sum of a nominal power for the first PUSCH transmission and of a nominal power for the second PUSCH transmission exceeds a maximum transmission power in the SF according to this disclosure.

FIG. 11 illustrates an exemplary power allocation by a UE in a SF when the UE has a first PUSCH transmission that includes UCI, a second PUSCH transmission that includes UCI, other PUSCH transmissions, and a sum of a nominal power for the first PUSCH transmission and of a nominal power for the second PUSCH transmission exceeds a maximum transmission power in the SF according to this disclosure.

In a SF i, UE 116 has a first PUSCH transmission that includes UCI in a first cell with a nominal power of $$\hat{P}_{PUSCH,j_{x_1}}(i),$$

a second PUSCH transmission that includes UCI in a second cell with a nominal power of $$\hat{P}_{PUSCH,j_{x_2}}(i),$$

and determines that $$\hat{P}_{PUSCH,j_{x_1}}(i) + \hat{P}_{PUSCH,j_{x_2}}(i) > \hat{P}_{CMAX}(i)$$

and that power allocation to the PUSCH transmission in the first cell is prioritized 1110. Depending on the UCI type or on a configuration by the network, UE 116 can determine whether to suspend the PUSCH transmission in the second cell or whether to transmit the PUSCH in the second cell with a reduced power compared to its nominal one 1120. When UE 116 transmits the PUSCH in the second cell, for example when it includes only A-CSI, UE 116 applies a reduced power $$\hat{P}_{PUSCH,j_{x_2},reduced}(i) \leq \hat{P}_{CMAX}(i) - \hat{P}_{PUSCH,j_{x_1}}(i)$$

1130. When the UE does not transmit the PUSCH in the second cell, for example when it includes HARQ-ACK, UE 116 allocates a remaining power of $$\hat{P}_{CMAX}(i) - \hat{P}_{PUSCH,j_{x_1}}(i)$$

to other PUSCH transmissions 1140 that have their power additionally scaled when $$\sum_{c \neq j_1, j_2} \hat{P}_{PUSCH,c}(i) > \hat{P}_{CMAX}(i) - \hat{P}_{PUSCH,j_{x_1}}(i).$$

Embodiment 2: TPC Commands for PUCCH Transmissions on PCell and PUCCH Transmissions on PSCell In the second embodiment, a use of TPC commands in a DCI Format 3/3A with a CRC scrambled with a TPC-PUCCH-RNTI by a UE is configured from an eNB to the UE by higher layer signaling. In each of the following alternatives, the UE is assumed to have two separate CL PC processes; a first for PUCCH transmissions on the PCell and a second for PUCCH transmissions on the PSCell. For brevity, as same principles apply, a use of TPC commands in a DCI Format 3/3A with a CRC scrambled with a TPC-PUSCH-RNTI the UE is configured from an eNB by higher layer signaling is not described.

In a first alternative, TPC commands in a DCI Format 3/3A transmitted in a PDCCH on the PCell apply only for PUCCH transmissions on the PCell. Upon detecting a DCI Format 3/3A with CRC scrambled with a TPC-PUCCH-RNTI, UE 116 applies a respective TPC command only for PUCCH transmissions on the PCell. UE 116 does not consider the TPC command for PUCCH transmissions on the PSCell. Similar to DC operation, additional DCI Format 3/3A transmission can be supported on the PSCell to provide TPC commands for PUCCH transmissions on the PSCell. A configuration of a TPC-PUCCH-RNTI for a DCI Format 3/3A transmitted in a PDCCH on the PCell can be separate (independent) from a configuration of a TPC-PUCCH-RNTI for a DCI Format 3/3A transmitted in a PDCCH on the PSCell.

In a second alternative, eNB 102 configures UE 116 with a first TPC-PUCCH-RNTI for scrambling a CRC of a DCI Format 3/3A conveying TPC commands for PUCCH transmissions on the PCell and with a second TPC-PUCCH-RNTI, different than the first TPC-PUCCH-RNTI, for scrambling a CRC of a DCI Format 3/3A conveying TPC commands for PUCCH transmissions on the PSCell. Unlike DC operation, both a DCI Format 3/3A with the first TPC-PUCCH-RNTI and a DCI format with the second TPC-PUCCH-RNTI are transmitted on the PCell. Upon detecting a DCI Format 3/3A with CRC scrambled with the first TPC-PUCCH-RNTI, UE 116 applies a respective TPC command only for PUCCH transmissions on the PCell. Upon detecting a DCI Format 3/3A with CRC parity bits scrambled with the second TPC-PUCCH-RNTI, UE 116 applies a respective TPC command only for PUCCH transmissions on the PSCell.

In a third alternative, unlike DC operation, eNB 102 configures UE 116 with a TPC-PUCCH-RNTI and with a first location for binary elements of a TPC command for the PCell in a DCI Format 3/3A and with a second location for binary elements of a TPC command for the PSCell in the DCI Format 3/3A. The configuration can be joint or separate. Upon detecting the DCI Format 3/3A with CRC scrambled with the TPC-PUCCH-RNTI on the PCell, UE 116 applies a TPC command obtained from binary elements of DCI Format 3/3A in the first location for PUCCH transmission in the PCell and applies a TPC command obtained from binary elements of DCI Format 3/3A in the second location for PUCCH transmission on the PSCell.

Figure 12:
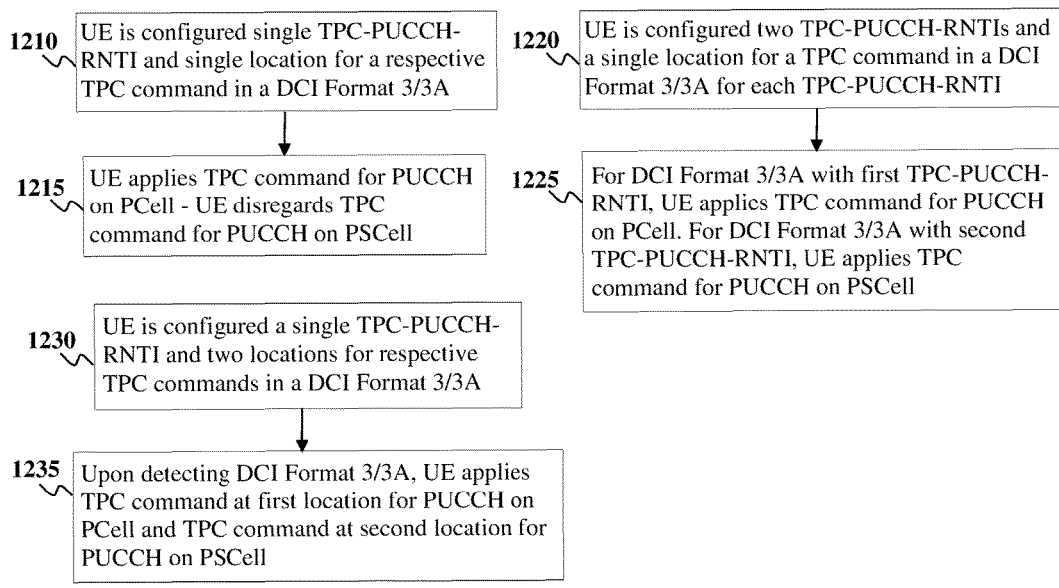
FIG. 12 illustrates a use by a UE of Transmission Power Control (TPC) commands in DCI Format 3/3A for determination of a power for a PUCCH transmission on a PCell and of a power for a PUCCH transmission on a PSCell according to this disclosure.

FIG. 12 illustrates a use by a UE of TPC commands in DCI Format 3/3A for determination of a power for PUCCH transmission on a PCell and of a power for PUCCH transmission on a PSCell according to this disclosure.

In a first alternative, eNB 102 configures UE 116 with a single TPC-PUCCH-RNTI for a DCI Format 3/3A and a single location for a respective TPC command 1210. Upon detecting a DCI Format 3/3A with CRC scrambled with the TPC-PUCCH-RNTI, UE 116 applies the TPC command for PUCCH transmission on the PCell and disregards the TPC command for PUCCH transmission on the PSCell 1215.

In a second alternative, eNB 102 configures UE 116 with two TPC-PUCCH-RNTIs for DCI Formats 3/3A and with a single respective location for a TPC command in a DCI Format 3/3A for each respective TPC-PUCCH-RNTI 1220. Upon detecting a DCI Format 3/3A with CRC scrambled with the first TPC-PUCCH-RNTI on the PCell, UE 116 applies the TPC command at the respective location for PUCCH transmission on the PCell while upon detecting a DCI Format 3/3A with CRC scrambled with the second TPC-PUCCH-RNTI on the PCell UE 116 applies the TPC command at the respective location for PUCCH transmission on the PSCell 1225.

In a third alternative, eNB 102 configures UE 116 with a single TPC-PUCCH-RNTI for a DCI Format 3/3A and with two locations for respective TPC commands in the DCI Format 3/3A 1230. Upon detecting a DCI Format 3/3A with CRC scrambled with the TPC-PUCCH-RNTI on the PCell, UE 116 applies the TPC command at the first location for PUCCH transmission on the PCell and the TPC command at the second location for PUCCH transmission on the PSCell 1235.

Embodiment 3: Minimizing Loss of UCI Due to Transmission Power Limitations

In the third embodiment, a UE is able to transmit all UCI in a single PUCCH or in a single PUSCH on a PCell or on a PSCell according to conditions that are subsequently described. The advantage of the UE transmitting all UCI in a single PUCCH or in a single PUSCH is that the UE avoids simultaneous transmissions of multiple channels to convey UCI and this can reduce UE power limitation occurrences and spectral emissions. Moreover, a PUCCH or a PUSCH with the better channel conditions can be selected especially when MCG cells and SCG cells are not collocated and transmissions on MCG cells can experience different path-loss than transmissions on SCG cells.

For HARQ-ACK transmission in a PUCCH, when UE 116 receives one or more PDSCHs only on respective cells of the MCG, UE 116 transmits HARQ-ACK only on a PUCCH on the PCell while when UE 116 receives one or more PDSCHs only on respective cells of the SCG, UE 116 transmits HARQ-ACK only in a PUCCH on the PSCell. Transmitting HARQ-ACK on the PCell when UE 116 receives PDSCH only on MCG cells can be beneficial in providing mobility support when connection to SCG cells is lost. Transmitting HARQ-ACK on the PSCell when UE 116 receives PDSCH on at least one SCG cell can be beneficial in providing load balancing and a better link quality for HARQ-ACK transmission when, for example, the MCG includes a macro-cell and the SCG includes small cells. When UE 116 receives one or more PDSCHs on respective cells of the MCG and also receives one or more PDSCHs on respective cells of the SCG, UE 116 can transmit HARQ-ACK on a single PUCCH such as, for example, on a PUCCH on the PSCell when a capacity of the PUCCH is equal to or larger than a total number of HARQ-ACK bits for MCG cells and for SCG cells.

Specifically, when UE 116 transmits a number of $M_1$ HARQ-ACK bits in response to one or more PDSCH transmissions on MCG cells, a number of $M_2$ HARQ-ACK bits in response to one or more PDSCH transmissions on SCG cells, and UE 116 uses for HARQ-ACK transmission a PUCCH format with capacity of N bits, UE 116 can multiplex all HARQ-ACK bits in a same PUCCH in a SF when $M_1+M_2 \leq N$. For example, the $M_1$ HARQ-ACK bits for MCG cells can be placed after the $M_2$ HARQ-ACK bits for SCG cells (a predetermined interleaving of HARQ-ACK bits can also occur after the initial placement). When UE 116 is configured for SR transmission in the SF, the previous condition becomes $M_1+M_2<N$ where, for example, the single SR bit can be placed last. When UE 116 is configured P-CSI transmission of P bits for a SCG cell in the SF (and possibly SR transmission), the condition for multiplexing HARQ-ACK bits for PDSCH transmissions on MCG cells and on SCG cells and P-CSI bits in the PUCCH is $M_1+M_2+P \leq N$ (or $M_1+M_2+P<N$ when SR can also be transmitted in the SF). For example, the $M_1$ HARQ-ACK bits for the PCell can be placed after the $M_2$ HARQ-ACK bits and the P P-CSI bits for the SCG cell. A same functionality as for HARQ-ACK bits can be extended for P-CSI and P-CSI bits for one or more MCG cells and one or more SCG cells can be multiplexed in a same PUCCH when a respective PUCCH format has sufficient multiplexing capacity.

Figure 13:
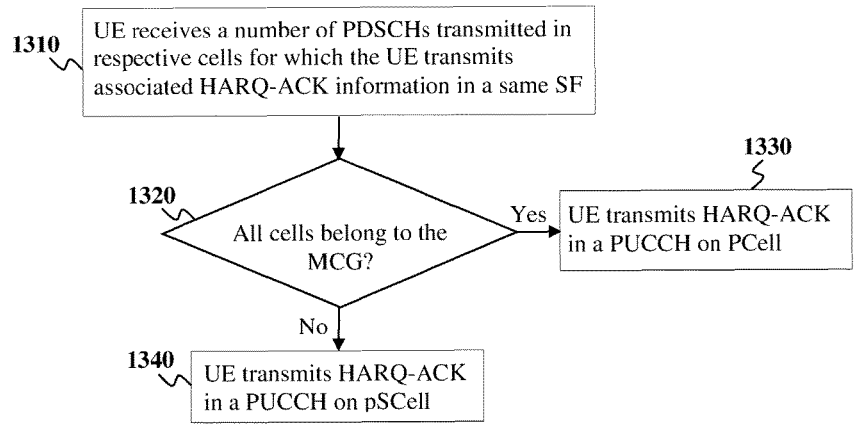
FIG. 13 illustrates a selection by a UE of a cell to transmit a PUCCH with Hybrid Automatic Repeat Request (HARQ)-Acknowledgment (ACK) information depending on whether the HARQ-ACK information is in response to PDSCH transmissions only on Master Cell Group (MCG) cells or in response to PDSCH transmissions on both MCG cells and Secondary Cell Group (SCG) cells or only on SCG cells according to this disclosure.

FIG. 13 illustrates a selection by a UE of a cell to transmit a PUCCH with HARQ-ACK information depending on whether the HARQ-ACK information is in response to PDSCH transmissions only on MCG cells or in response to PDSCH transmissions on both MCG cells and SCG cells or only on SCG cells according to this disclosure.

UE 116 receives a number of PDSCHs transmitted on respective cells. In response to the reception of the number of PDSCHs, UE 116 transmits associated HARQ-ACK information in a same SF 1310. UE 116 examines whether all cells belong to the MCG 1320. When all cells belong to the MCG, UE 116 transmits HARQ-ACK information in a PUCCH on the PCell 1330. When at least one cell belongs to SCG, UE 116 transmits HARQ-ACK information in a PUCCH on the PSCell when the PUCCH multiplexing capacity is sufficient for HARQ-ACK bits corresponding to PDSCH transmissions on MCG cells and on SCG cells 1340. When at least one cell belongs to the MCG and at least one cell belongs to the SCG and neither the PUCCH multiplexing capacity on the PCell nor the PUCCH multiplexing capacity on the PSCell is sufficient to multiplex corresponding HARQ-ACK bits, UE 116 transmits HARQ-ACK bits for the MCG cells in a PUCCH on the PCell and transmits HARQ-ACK bits for the SCG cells in a PUCCH on the PSCell.

When eNB 102 configures UE 116 to transmit a UCI type, such as HARQ-ACK, for one or more MCG cells and for one or more SCG cells in a same PUCCH on a cell of a first cell group, such as a SCG, and to transmit a PUSCH in a same SF on a cell of a second cell group, such as a MCG, two alternatives are considered for the HARQ-ACK transmission.

In a first alternative, UE 116 multiplexes HARQ-ACK for the one or more cells of the MCG or of the SCG in the PUSCH and multiplexes UCI for the one or more cells of the SCG or of the MCG in the PUCCH, respectively. Therefore, for example, even though UE 116 transmits UCI such as HARQ-ACK for all corresponding cells of the MCG and of the SCG in a same PUCCH on a PSCell when UE 116 transmits UCI for at least for one SCG cell, when UE 116 transmits a PUSCH on a MCG cell, UE 116 multiplexes UCI for MCG cells in the PUSCH. When the PUSCH transmission is in response to a DCI format detected by UE 116, a DAI field in the DCI format is interpreted relative only to cells of the cell group containing the cell where UE 116 transmits the PUSCH.

In a second alternative, UE 116 multiplexes all UCI in the PUSCH and does not transmit PUCCH. In this manner, all cells are viewed as belonging to a common cell group rather than being split between the MCG and the SCG. Therefore, even when UCI transmission in a PUCCH can be on the PCell for one or more cells of a MCG or on the PSCell for one or more cells of the SCG, UCI multiplexing can be in a same PUSCH transmitted either on a cell of the MCG or on a cell of the SCG. This is beneficial in avoiding UE 116 having to drop some UCI transmissions when UE 116 is power limited when transmitting multiple PUCCHs or PUSCHs.

When UE 116 multiplexes HARQ-ACK in a PUSCH that UE 116 transmits in response to DCI format detection, UE 116 interprets a DAI field in the DCI format relative to all cells of the MCG and the SCG rather than relative to all cells of the cell group containing the cell where UE 116 transmits the PUSCH. When UE 116 transmits PUSCH in one or more MCG cells and in one or more SCG cells, HARQ-ACK can be multiplexed either in a cell with the lowest global index (across MCG cells and SCG cells) or in a SCG cell with the lowest index. For example, MCG cells and SCG cells can be serially indexed starting from MCG cells and the PCell. A reason for selecting a SCG cell is because UE 116 can have better channel conditions, such as a smaller path-loss, for transmissions to the SCG than for transmissions to the MCG, for example when the MCG cells and the SCG cells are not co-located.

Figure 14:
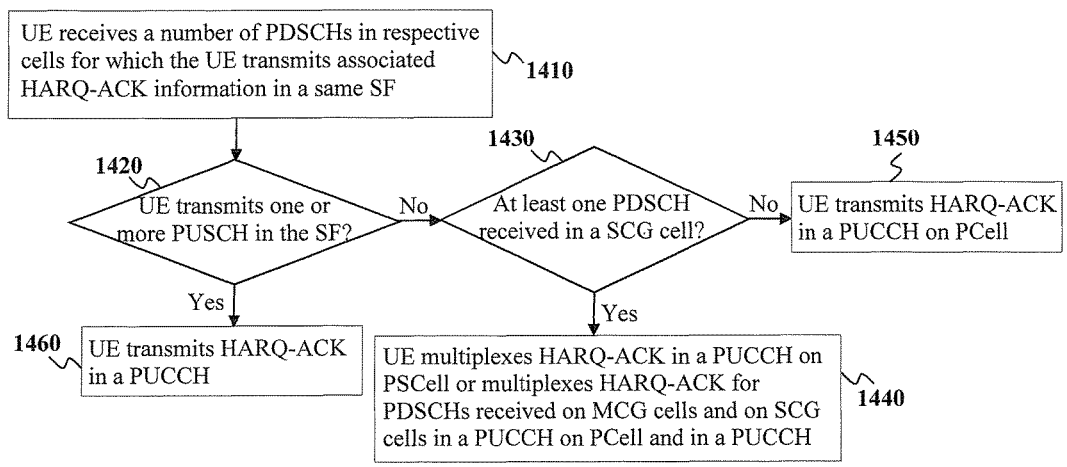
FIG. 14 illustrates a multiplexing of HARQ-ACK information in a PUCCH or in a PUSCH according to this disclosure.

FIG. 14 illustrates a multiplexing of HARQ-ACK information in a PUCCH or in a PUSCH according to this disclosure.

UE 116 receives a number of PDSCHs in respective cells. In response to the number of received PDSCHs, UE 116 transmits HARQ-ACK information in a SF 1410. When UE 116 does not transmit PUSCH in the SF 1420, UE 116 determines whether or not at least one PDSCH is received on a cell of a SCG 1430. When at least one PDSCH is received on a cell of the SCG, UE 116 multiplexes the HARQ-ACK information in a PUCCH transmitted on the PSCell or UE 116 multiplexes the HARQ-ACK information for PDSCHs received on MCG cells and on SCG cells in a PUCCH transmitted on the PCell and in a PUCCH transmitted on the PSCell, respectively 1440. When UE 116 does not receive any PDSCH on a cell of the SCG, UE 116 multiplexes the HARQ-ACK information in a PUCCH transmitted on the PCell 1450. When the UE transmits one or more PUSCHs in the SF, UE 116 multiplexes the HARQ-ACK information in a PUSCH from the one or more PUSCHs 1460. The PUSCH conveying the HARQ-ACK information can be the one transmitted on the SCG cell with the lowest index, when any, or can be the one transmitted on the cell with the lowest index among MCG cells and SCG cells.

When TDD is used on the PSCell and FDD is used on the PCell, UCI multiplexing for MCG cells in a PUCCH of the PSCell can be only in UL SFs of the UL/DL configuration used for PUCCH transmissions in the PSCell. Then, for UCI signaling, and particularly HARQ-ACK signaling, the roles of the PSCell and the PCell can be reversed with the PSCell becoming the PCell and UCI transmissions can be as described in REF 3 for the case of a TDD PCell and a FDD SCell and for PUCCH transmission only on the PCell. One exception can occur when UE 116 transmits HARQ-ACK only for one or more MCG cells and in such case UE 116 can use a PUCCH on the PCell of the MCG.

For cross-carrier scheduling where a PDSCH transmission on a SCG cell is scheduled by a DCI format transmitted in a PDCCH on a MCG cell, a respective PUCCH resource for a HARQ-ACK transmission on a PSCell of the SCG is configured to UE 116 by eNB 102 through higher layer signaling such as RRC signaling. This is because a conventional determination for a PUCCH resource that is based on a lowest CCE index of the PDCCH conveying the DCI format, as described in REF 3, can lead to PUCCH resource collisions. For example, when the MCG consists of a PCell and the SCG consists of a PSCell and a PDSCH transmission on the PSCell is scheduled by a DCI format conveyed by a PDCCH transmitted on the PCell, a PUCCH resource for transmitting respective HARQ-ACK information is determined from a lowest CCE index of the PUCCH when the transmission is on the PCell but is configured by higher layer signaling when the transmission is on the PSCell.

When UE 116 transmits HARQ-ACK information on the PSCell using a PUCCH Format 3 (see also REF 1) and for a FDD system, a TPC field in a DCI format scheduling a PDSCH transmission on the PSCell can provide a TPC command to UE 116 for PUCCH transmission while a TPC field in a DCI format scheduling a PDSCH reception in any SCG cell other than the PSCell can provide to UE 116 an indication of a PUCCH resource from a set of PUCCH resources configured to UE 116 on the PSCell from eNB 102 by higher layer signaling. Similar, when UE 116 transmits HARQ-ACK information on the PCell using a PUCCH Format 3 and for a FDD system, a TPC field in a DCI format scheduling a PDSCH transmission on the PCell can provide a TPC command to UE 116 for PUCCH transmission while a TPC field in a DCI format scheduling a PDSCH transmission on any MCG cell other than the PCell can provide to UE 116 an indication of a PUCCH resource from a set of PUCCH resources on the PCell configured to UE 116 from eNB 102 by higher layer signaling.

When UE 116 transmits HARQ-ACK information on the PSCell using a PUCCH Format 3 and for a TDD system, a TPC field in a DCI format having a DAI field with a value of '1' and scheduling a PDSCH transmission on the PSCell can provide a TPC command to UE 116 for PUCCH transmission. A TPC field in any other DCI format scheduling a PDSCH transmission on any SCG cell other than the PSCell can provide to UE 116 an indication of a PUCCH resource from a set of PUCCH resources configured from eNB 102 to UE 116 by higher layer signaling. Similar, when UE 116 transmits HARQ-ACK information on the PCell using a PUCCH Format 3 and for a TDD system, a TPC field in a DCI format having a DAI field with a value of '1' and scheduling a PDSCH transmission on the PCell can provide a TPC command to UE 116 for PUCCH transmission. A TPC field in any other DCI format scheduling a PDSCH transmission in any MCG cell other than the PCell can provide to UE 116 an indication of a PUCCH resource from a set of PUCCH resources configured from eNB 102 to UE 116 by higher layer signaling.

Although the present disclosure has been described with example embodiments, various changes and modifications may be suggested to one skilled in the art. It is intended that the present disclosure encompass such changes and modifications that fall within the scope of the appended claims.

What is claimed is:

1. A method for a user equipment (UE) to communicate with a network that includes a number of cells, the method comprising:

receiving by the UE from the network a configuration for a first group of cells and for a second group of cells; and transmitting from the UE on the first group of cells and on the second group of cells in a transmission time interval (TTI) wherein:
when a communication delay between the first group of cells and the second group of cells is larger than a value, the UE is configured by the network with a first minimum power available for transmissions on the first group of cells in the TTI and a second minimum power available for transmissions on the second group of cells in the TTI, wherein a sum of the first minimum power and the second minimum power in the TTI is smaller than a maximum power in the TTI, and
when the communication delay between the first group of cells and the second group of cells is smaller than or equal to the value, the UE is not configured with the first minimum power for transmissions on the first group of cells in the TTI or the second minimum power for transmissions on the second group of cells in the TTI.

2. The method of claim 1, wherein the communication delay is smaller than or equal to the value and when the UE transmits physical random access channels (PRACHs) in the TTI, the UE prioritizes power allocation to the transmissions of the PRACHs and adjusts the maximum power for other transmissions in the TTI as a difference between the maximum power for transmissions in the TTI and the power for the transmissions of the PRACHs in the TTI.

3. The method of claim 2, wherein the UE
determines a first power for transmitting a first channel with first control information to a first cell in the first group of cells in the TTI according to a first power control process;
determines a second power for transmitting a second channel with second control information to a second cell in the second group of cells in the TTI according to a second power control process;
determines that a sum of the first power and of the second power is larger than the maximum power in the TTI;
determines a third power for transmitting the second channel wherein the third power is smaller than the second power and a sum of the first power and of the third power is smaller than or equal to the maximum power in the TTI;
transmits the first channel with the first power and transmits the second channel with the third power when a difference between the second power and the third power is smaller than or equal to a threshold value; and
transmits the first channel with the first power and suspends a transmission of the second channel when the difference between the second power and the third power is larger than the threshold value.

4. The method of claim 3, wherein the UE suspends transmission for all channels that include data information and do not include control information in the TTI and suspends transmission for all sounding reference signals in the TTI.

5. The method of claim 2, wherein the UE
determines a first power for transmitting a first channel with first control information to a first cell in the first group of cells in the TTI according to a first power control process;
determines a second power for transmitting a second channel with second control information to a second cell in the second group of cells in the TTI according to a second power control process;
determines that a sum of the first power and of the second power is larger than the maximum power in the TTI;
determines a third power for transmitting the second channel wherein the third power is smaller than the second power and a sum of the first power and of the third power is smaller than or equal to the maximum power in the TTI;
transmits the first channel with the first power and transmits the second channel with the third power when a codeword for the second control information includes cyclic redundancy check bits; and
transmits the first channel with the first power and suspends a transmission of the second channel when the codeword for the second control information does not include cyclic redundancy check bits.

6. The method of claim 5, wherein the UE suspends transmission for all channels that include data information and do not include control information in the TTI and suspends transmission for all sounding reference signals in the TTI.

7. A method for a user equipment (UE) to transmit a physical uplink control channel (PUCCH), the method comprising:
receiving
a configuration for a first group of cells and for a second group of cells, wherein the first group of cells or the second group of cells includes more than one cell,
a configuration for transmit power control (TPC)—PUCCH—Radio Network Temporary Identifier (RNTI) bits for scrambling cyclic redundancy check (CRC) bits of a downlink control information (DCI) format,
a configuration for a first location in the DCI format for TPC bits for adjusting a power of a PUCCH transmission on a cell from the first group of cells, and
a configuration for a second location in the DCI format for TPC bits for adjusting a power of a PUCCH transmission on a cell from the second group of cells;
detecting the DCI format on a cell from the first group of cells; and
transmitting a first PUCCH on the cell from the first group of cells using a power adjustment determined by the TPC bits at the first location in the DCI format or a second PUCCH on the cell of the second group of cells using a power adjustment determined by the TPC bits at the second location in the DCI format.

8. The method of claim 7, further comprising:
receiving, by the UE, a configuration of a primary-secondary cell (PSCell) from the second group of cells; and
transmitting the second PUCCH on the PSCell.

9. The method of claim 7, further comprising:
receiving
a configuration for TPC—physical uplink shared channel (PUSCH)—RNTI bits for scrambling CRC bits of a DCI format,
a configuration for a first location in the DCI format for TPC bits for adjusting a power of a PUSCH transmission on a cell from the first group of cells, and
a configuration for a second location in the DCI format for TPC bits for adjusting a power of a PUSCH transmission on a cell from the second group of cells;
detecting the DCI format; and
transmitting a first PUSCH on a third cell from the first group of cells using a power adjustment determined by the TPC bits at the first location in the DCI format and a second PUSCH on a fourth cell of the second group from cells using a power adjustment determined by the TPC bits at the second location in the DCI format.

10. The method of claim 9, further comprising:
receiving a negative acknowledgment information in response to a transmission of a data transport block in a third PUSCH on the fourth cell from the second group of cells; and
transmitting, in response to the negative acknowledgement information, the data transport block in the second PUSCH on the second cell from the second group of cells.

11. A user equipment (UE) comprising:
a receiver configured to receive a configuration for a first group of cells and for a second group of cells; and
a transmitter configured to transmit on the first group of cells and on the second group of cells in a transmission time interval (TTI) wherein
when a communication delay between the first group of cells and the second group of cells is larger than a value, the UE is configured with a first minimum power available for transmissions on the first group of cells in the TTI and a second minimum power available for transmissions on the second group of cells in the TTI, wherein a sum of the first minimum power and the second minimum power in the TTI is smaller than a maximum power in the TTI, and
when the communication delay between the first group of cells and the second group of cells is smaller than or equal to the value, the UE is not configured with the first minimum power for transmissions on the first group of cells in the TTI or the second minimum power for transmissions on the second group of cells in the TTI.

12. The UE of claim 11, wherein the communication delay is smaller than or equal to the value and when the UE transmits physical random access channels (PRACHs) in the TTI, the UE prioritizes power allocation to the transmissions of the PRACHs and adjusts the maximum power for other transmissions in the TTI as a difference between the maximum power for transmissions in the TTI and the power for the transmissions of the PRACHs in the TTI.

13. The UE of claim 12, further comprising:
a computing unit configured to:
determine a first power for transmitting a first channel with first control information to a first cell in the first group of cells in the TTI according to a first power control process,
determine a second power for transmitting a second channel with second control information to a second cell in the second group of cells in the TTI according to a second power control process,
determine that a sum of the first power and of the second power is larger than the maximum power in the TTI, and
determine a third power for transmitting the second channel wherein the third power is smaller than the second power and a sum of the first power and of the third power is smaller than or equal to the maximum power in the TTI; and
a controller configured to enable transmission of the first channel with the first power and either enable transmission of the second channel with the third power when a difference between the second power and the third power is smaller than or equal to a threshold value or suspend transmission of the second channel when the difference between the second power and the third power is larger than the threshold value.

14. The UE of claim 13, wherein the controller suspends transmission for all channels that include data information and do not include control information in the TTI and suspends transmission for all sounding reference signals in the TTI.

15. The UE of claim 12, further comprising:
a computing unit configured to:
determine a first power for transmitting a first channel with first control information to a first cell in the first group of cells in the TTI according to a first power control process,
determine a second power for transmitting a second channel with second control information to a second cell in the second group of cells in the TTI according to a second power control process,
determine that a sum of the first power and of the second power is larger than the maximum power in the TTI, and
determine a third power for transmitting the second channel wherein the third power is smaller than the second power and a sum of the first power and of the third power is smaller than or equal to the maximum power in the TTI; and
a controller configured to enable transmission of the first channel with the first power and either enable transmission of the second channel with the third power when a codeword for the second control information includes cyclic redundancy check bits or suspend transmission of the second channel when the codeword for the second control information does not include cyclic redundancy check bits.

16. The UE of claim 15, wherein the controller suspends transmission for all channels that include data information and do not include control information in the TTI and suspends transmission for all sounding reference signals in the TTI.

17. A user equipment (UE), comprising:
a receiver configured to receive
a configuration for a first group of cells and for a second group of cells, wherein the first group of cells or the second group of cells includes more than one cell,
a configuration for transmit power control (TPC)—physical uplink control channel (PUCCH)—Radio Network Temporary Identifier (RNTI) bits for scrambling cyclic redundancy check (CRC) bits of a downlink control information (DCI) format,
a configuration for a first location in the DCI format for TPC bits for adjusting a power of a PUCCH transmission on a cell from the first group of cells, and
a configuration for a second location in the DCI format for TPC bits for adjusting a power of a PUCCH transmission on a cell from the second group of cells;
a detector configured to detect the DCI format on a cell from the first group of cells; and
a transmitter configured to transmit a PUCCH on the cell from the first group of cells using a power adjustment determined by the TPC bits at the first location in the DCI format or a second PUCCH on the cell of the second group of cells using a power adjustment determined by the TPC bits at the second location in the DCI format.

18. The UE of claim 17 wherein the receiver is further configured to receive a configuration of a primary-secondary cell (PSCell) from the second group of cells and the transmitter is further configured to transmit the second PUCCH on the PSCell.

19. The UE of claim 17, wherein the receiver is further configured to receive
- a configuration for TPC—physical uplink shared channel (PUSCH)—RNTI bits for scrambling CRC bits of a DCI format,
- a configuration for a first location in the DCI format for TPC bits for adjusting a power of a PUSCH transmission on a cell from the first group of cells, and
- a configuration for a second location in the DCI format for TPC bits for adjusting a power of a PUSCH transmission on a cell from the second group of cells,
- wherein the detector is further configured to detect the DCI format, and
- wherein the transmitter is further configured to transmit a first PUSCH on a third cell from the first group of cells using a power adjustment determined by the TPC bits at the first location in the DCI format and a second PUSCH on a fourth cell from the second group of cells using a power adjustment determined by the TPC bits at the second location in the DCI format.

20. The UE of claim 19, wherein the receiver is further configured to receive a negative acknowledgment information in response to a transmission of a data transport block in a third PUSCH on the fourth cell from the second group of cells and wherein, in response to the negative acknowledgement information, the transmitter is configured to transmit the data transport block in the second PUSCH on the fourth cell from the second group of cells.

\* \* \* \* \*